US008097112B2

(12) United States Patent
Hori et al.

(10) Patent No.: US 8,097,112 B2
(45) Date of Patent: Jan. 17, 2012

(54) METHOD FOR MANUFACTURING MEMBRANE-ELECTRODE ASSEMBLY

(75) Inventors: Yoshihiro Hori, Nara (JP); Mikiko Yoshimura, Osaka (JP); Takeou Okanishi, Osaka (JP); Kazuhito Hatoh, Osaka (JP)

(73) Assignees: Panasonic Corporation, Osaka (JP); Asahi Glass Company, Limited, Tokyo (JP)

( * ) Notice: Subject to any disclaimer, the term of this patent is extended or adjusted under 35 U.S.C. 154(b) by 810 days.

(21) Appl. No.: 11/993,114

(22) PCT Filed: Mar. 29, 2006

(86) PCT No.: PCT/JP2006/306565
§ 371 (c)(1),
(2), (4) Date: Dec. 19, 2007

(87) PCT Pub. No.: WO2006/137203
PCT Pub. Date: Dec. 28, 2006

(65) Prior Publication Data
US 2010/0038020 A1 Feb. 18, 2010

(30) Foreign Application Priority Data
Jun. 20, 2005 (JP) ................ 2005-179908

(51) Int. Cl.
*B29C 65/00* (2006.01)
*B32B 27/00* (2006.01)
*B32B 37/00* (2006.01)
*B05D 5/12* (2006.01)

(52) U.S. Cl. .............. 156/278; 156/196; 427/115

(58) Field of Classification Search ............ 156/196, 156/278; 427/115
See application file for complete search history.

(56) References Cited

U.S. PATENT DOCUMENTS

| 2003/0096154 A1 | 5/2003 | Yasumoto et al. |
| 2003/0158273 A1* | 8/2003 | Kosako et al. .............. 521/27 |
| 2004/0241525 A1* | 12/2004 | Mekala et al. ............. 429/36 |

FOREIGN PATENT DOCUMENTS

| JP | 07-176317 | 7/1995 |
| JP | 10-308228 | 11/1998 |
| JP | 11-288728 | 10/1999 |
| JP | 2000-294257 | 10/2000 |
| JP | 2003-100314 | 4/2003 |
| JP | 2003-346835 | 12/2003 |
| JP | 2004-200063 | 7/2004 |
| JP | 2005-149847 | 6/2005 |

* cited by examiner

*Primary Examiner* — Philip Tucker
*Assistant Examiner* — Michael Orlando
(74) *Attorney, Agent, or Firm* — McDermott Will & Emery LLP

(57) ABSTRACT

A method for manufacturing a membrane-electrode assembly of the present invention includes: a reinforcing member disposing step of disposing a reinforcing member (104A, 104B), whose frame portion is formed to surround an opening of the reinforcing member, on a polymer electrolyte membrane (102) such that the frame portion covers a peripheral portion of at least one surface of the polymer electrolyte membrane; a catalyst layer applying step of applying a coating of a catalyst layer (109A, 109B) on at least an entire surface of the polymer electrolyte membrane (102) which surface is exposed from the opening of the reinforcing member (104A, 104B); and a gas diffusion layer disposing step of disposing a gas diffusion layer (114A, 114B) such that the gas diffusion layer covers the catalyst layer (109A, 109B).

7 Claims, 8 Drawing Sheets

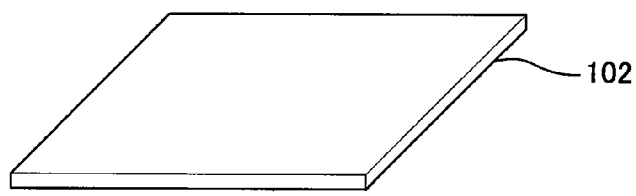
Fig. 1-A
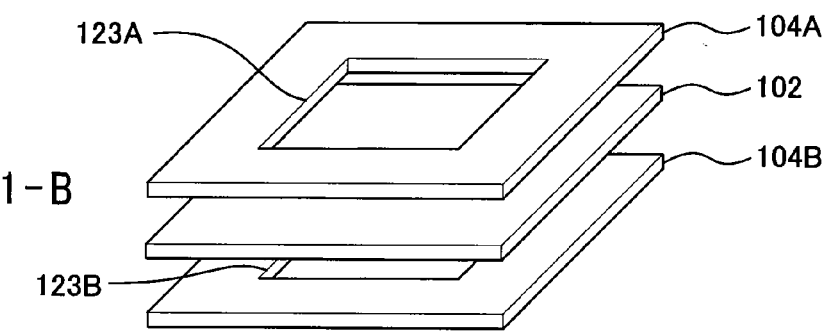
Fig. 1-B
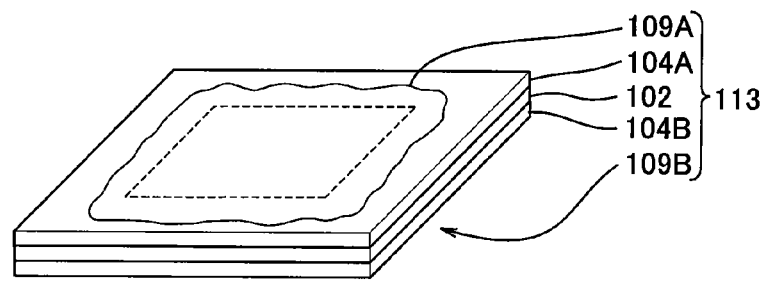
Fig. 1-C
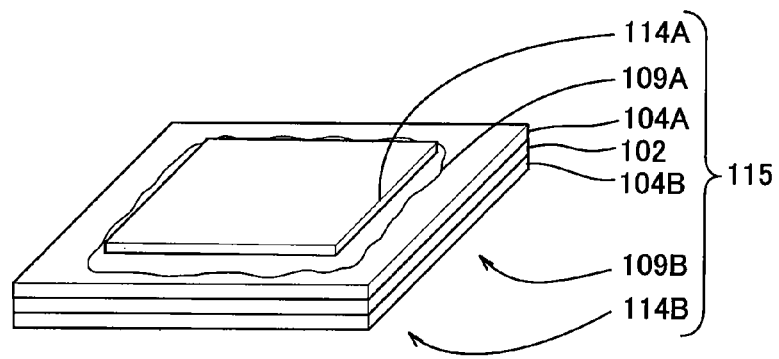
Fig. 1-D

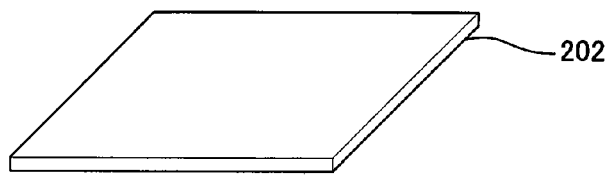
Fig. 3-A
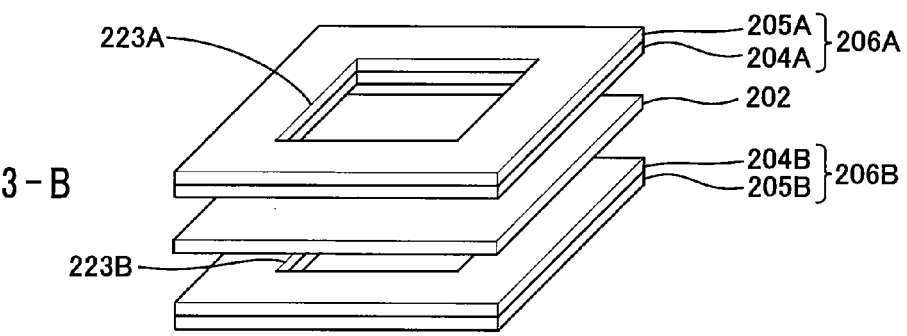
Fig. 3-B
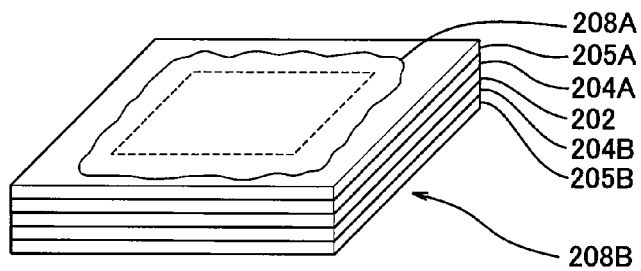
Fig. 3-C
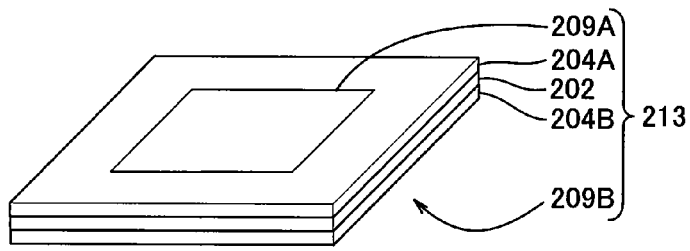
Fig. 3-D
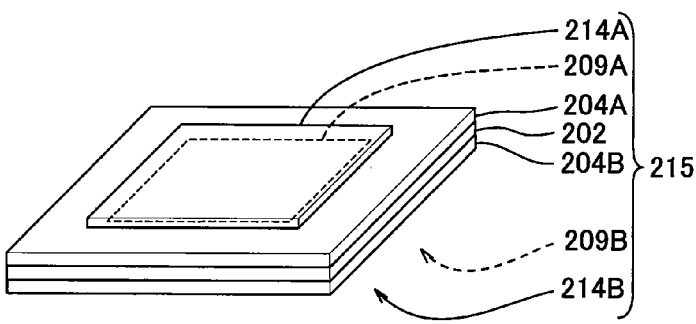
Fig. 3-E Fig. 7-A
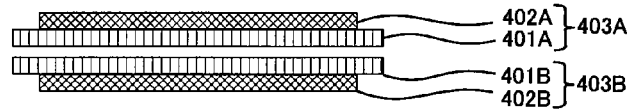
Fig. 7-B
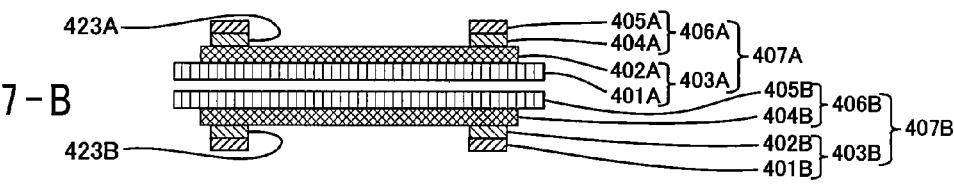
Fig. 7-C
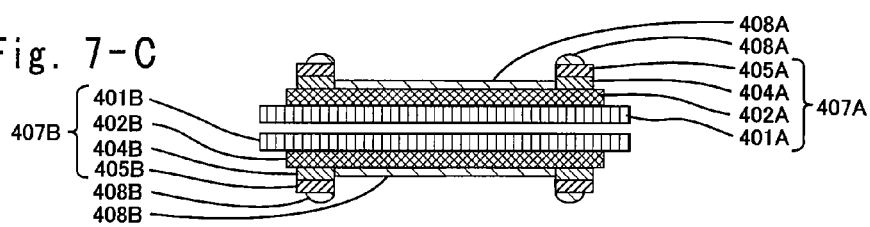
Fig. 7-D
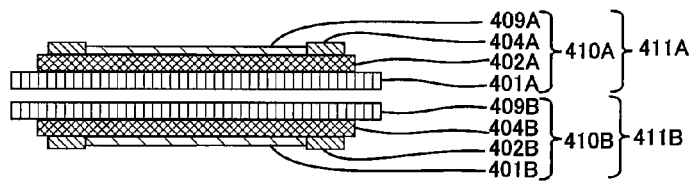
Fig. 7-E
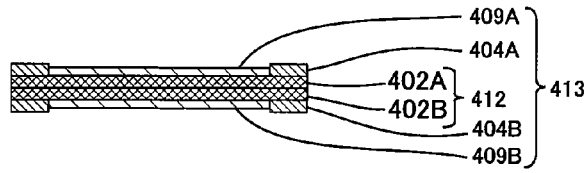
Fig. 7-F
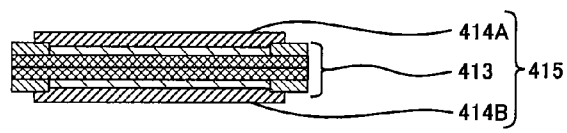
Fig. 7-G
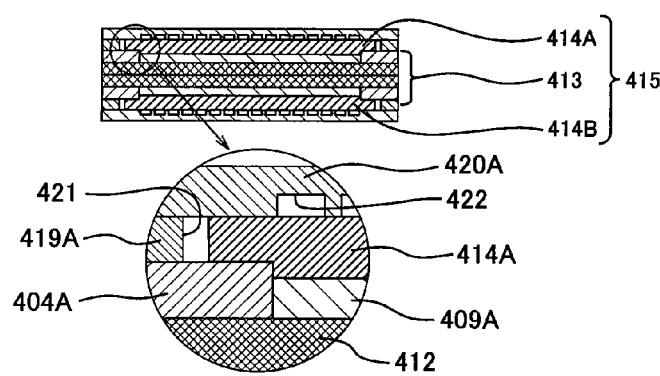

Fig. 8-A
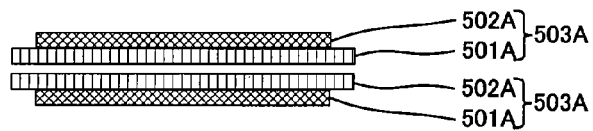
Fig. 8-B
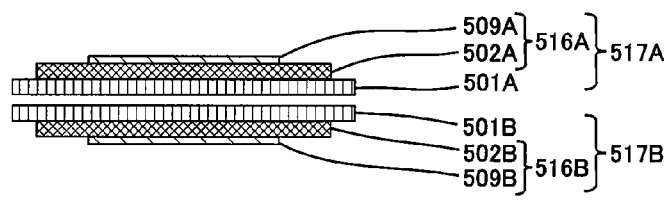
Fig. 8-C
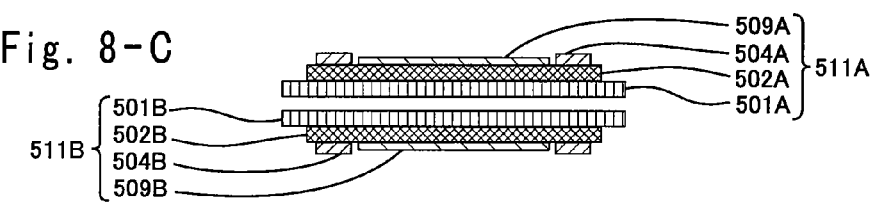
Fig. 8-D
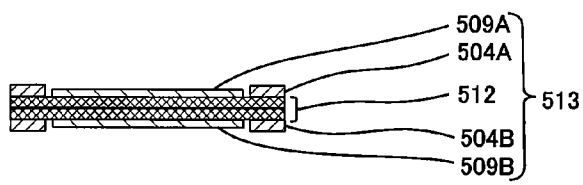
Fig. 8-E
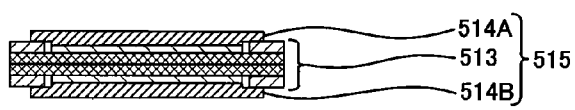
Fig. 8-F
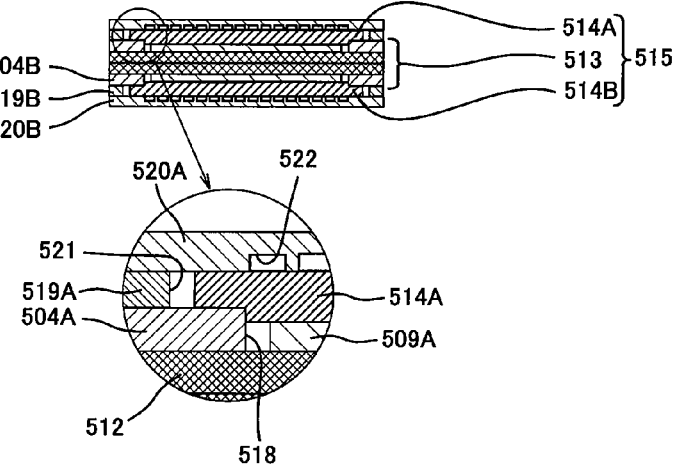

METHOD FOR MANUFACTURING MEMBRANE-ELECTRODE ASSEMBLY

RELATED APPLICATIONS

This application is the U.S. National Phase under 35 U.S.C. §371 of International Application No. PCT/JP2006/306565, filed on Mar. 29, 2006, which in turn claims the benefit of Japanese Application No. 2005-179908, filed on Jun. 20, 2005, the disclosures of which Applications are incorporated by reference herein.

TECHNICAL FIELD

The present invention relates to a method for manufacturing a membrane-electrode assembly of a solid polymer fuel cell. More particularly, the present invention relates to a method for manufacturing a membrane-electrode assembly having a reinforcing member at a peripheral portion of a polymer electrolyte membrane.

BACKGROUND ART

A solid polymer fuel cell has a structure in which catalyst layers (electrode layers) are stacked on both surfaces of a polymer electrolyte membrane having proton conductivity. This structure is referred to as a "membrane-electrode assembly (MEA)". Gas diffusion layers are formed on both surfaces of the membrane-electrode assembly to form a membrane-electrode-gas diffusion layer assembly. The membrane-electrode-gas diffusion layer assembly is hermetically sandwiched between a pair of separators, on each of which a gas passage is formed, to form a cell. The cells are stacked to form a structure called a stack.

An oxidant gas, such as oxygen, is supplied to one surface (cathode side) of the polymer electrolyte membrane through the passage of one of the separators. A fuel, such as hydrogen, is supplied to the other surface (anode side) of the polymer electrolyte membrane through the passage of the other separator. On the anode side, the fuel diffuses in the gas diffusion layer and reaches the catalyst layer. In the catalyst layer, protons and electrons are generated from the fuel by an electrode reaction. The protons pass through the polymer electrolyte membrane and move to the cathode side. On the cathode side, the oxidizing agent diffuses in the gas diffusion layer and reaches the catalyst layer. In the catalyst layer, water, etc. are generated from the protons and the oxidizing agent by the electrode reaction. The electrode reactions on the cathode side and on the anode side are accelerated by a catalyst, such as platinum or the like, included in the catalyst layers. The electrons are also attracted to the cathode side. However, by extracting the flow of the electrons outside, the energy of a chemical reaction (oxidation-reduction reaction) can be utilized as power.

In the case of manufacturing the stack, the polymer electrolyte membrane is sandwiched between the electrodes and the separators, and fastened by end plates and bolts. The polymer electrolyte membrane needs to have an adequate strength so as to endure the fastening pressure and not to be physically damaged by abrasion in a long-period use. In contrast, for the purpose of, for example, improving the proton conductivity, the polymer electrolyte membrane needs to be as thin as possible. For the reasons above, it is desirable to increase the strength of the polymer electrolyte membrane without increasing the thickness.

As a technique for solving the above problems, there is the solid polymer fuel cell disclosed in Experimental Example 2 of Patent Document 1. In the solid polymer fuel cell, the strength of the polymer electrolyte membrane is improved by attaching a frame to a peripheral portion of the polymer electrolyte membrane. The catalyst layer is applied on carbon nonwoven fabric (gas diffusion layer), and is joined to the polymer electrolyte membrane to which the frame is attached. The carbon nonwoven fabric (gas diffusion layer) and the catalyst layer are joined to the polymer electrolyte membrane so as to be formed to be slightly (about 1 mm) larger than a hole of the frame on both sides of the hole such that the catalyst layer completely covers the inside of the frame.

Patent Document 1: Japanese Unexamined Patent Application Publication 10-308228

DISCLOSURE OF THE INVENTION

Problems to be Solved by the Invention

In the above conventional structure, since the catalyst layer and the gas diffusion layer are larger than the hole of the frame, the catalyst layer is mounted on the frame together with the gas diffusion layer. The catalyst layer mounted on the frame contacts inner edge corners of the frame. In this state, in the case of sandwiching the membrane-electrode assembly by the separators, the pressing force concentrates on contact portions of the catalyst layer and the frame, and there is a possibility that the catalyst layer is distorted or damaged. The distortion or damage of the catalyst layer can be prevented by making the catalyst layer smaller than the hole of the frame. However, in accordance with this structure, a gap is formed between the gas diffusion layer and the frame and between the catalyst layer and the frame, so that there is a possibility that the short circuit of the reactant gas through the gap occur. Thus, in accordance with the conventional method, it is difficult to manufacture a membrane-electrode assembly in which no overlap or gap is formed between the frame and the catalyst layer, due to the precision limit of the alignment and the part size.

The present invention was made to solve the above problems, and an object of the present invention is to provide a method for efficiently manufacturing a membrane-electrode assembly in which a frame (reinforcing member) is disposed on a peripheral portion of a polymer electrolyte membrane, a catalyst layer is formed inside the reinforcing member with no gap therebetween, and the catalyst layer is not substantially distorted or damaged by a pressing force generated at the time of assembling a stack.

Means for Solving the Problems

The present inventors have diligently studied to improve power generation efficiency, device lifetime, producibility, etc. of a fuel cell having a membrane-electrode assembly in which a peripheral portion of a polymer electrolyte membrane is reinforced by hard resin. As a result, it is revealed that at the peripheral portion of the polymer electrolyte membrane, a problem (cross leakage, crossover) of the reactant gases (oxidant gas, fuel gas) directly reacting with each other through the membrane tends to occur. Guessingly, the cause of the problem is that in the membrane-electrode assembly, there is a path which allows the reactant gas to directly reach the membrane from the gas diffusion layer without passing through the catalyst layer. The cross leakage intensively occurs at the peripheral portion of the polymer electrolyte membrane. It is revealed that the peripheral portion of the membrane specifically deteriorates quickly, and there is a possibility that the life of the fuel cell may be reduced. To prevent the cross leakage, the membrane-electrode assembly needs to be constructed such that the reactant gas surely passes through the catalyst layer and reaches the polymer electrolyte membrane.

In accordance with the conventional method, as described above, the overlap or the gap tends to be formed between the catalyst layer and the frame. The cross leakage surely occurs if there is the gap. In contrast, it is thought that if the catalyst layer is formed to overlap the frame, the cross leakage does not occur since the gas passes through the catalyst layer and reaches the membrane. However, the pressing force concentrates on a portion where the frame and the catalyst layer overlap. If the catalyst layer is distorted or damaged by the pressing force, the cross leakage occurs. From the above studies, the present inventors have revealed that the overlap and the gap are problems which necessarily occur when the frame and the catalyst layer are separately formed and joined to each other. Further, the present inventors has discovered that by applying a coating of the catalyst layer inside the frame after the attachment of the frame to the polymer electrolyte membrane, no overlap or gap is formed between the frame and the catalyst layer.

Note that some polymer electrolyte membranes expand or contract depending on humidity, etc. Therefore, when the coating of the catalyst layer is directly applied on the membrane, wrinkling may be generated, which may be problematic. Due to reasons such as the wrinkling, a method for directly forming the catalyst layer on the membrane is not common up until now. However, in accordance with the studies by the present inventors, it is revealed that the generation of the wrinkling can be prevented by applying the coating of the catalyst layer on the membrane with the membrane suctioned and fixed by a suction-fixing apparatus (suction-fixing apparatus using a pressure reduction system) or with the membrane mounted (held, fixed) on a backing member.

In order to solve the above problems, a method for manufacturing a membrane-electrode assembly of the present invention comprises: a reinforcing member disposing step of disposing a reinforcing member, whose frame portion is formed to surround an opening of the reinforcing member, on a polymer electrolyte membrane such that the frame portion covers a peripheral portion of at least one surface of the polymer electrolyte membrane; a catalyst layer applying step of applying a coating of a catalyst layer on at least an entire surface of the polymer electrolyte membrane which surface is exposed from the opening of the reinforcing member; and a gas diffusion layer disposing step of disposing a gas diffusion layer such that the gas diffusion layer covers the catalyst layer.

In accordance with the method, since the coating of the catalyst layer is applied so as to cover the entire surface inside the opening of the reinforcing member and to spread over the reinforcing member, no gap is formed between the reinforcing member and the catalyst layer. The catalyst layer is not attached by being printed on nonwoven fabric or the like, but the coating of the catalyst layer is applied to the polymer electrolyte membrane. Therefore, even if the catalyst layer overlaps the reinforcing member, the catalyst layer is not substantially distorted or damaged. Thus, it is possible to efficiently manufacture the membrane-electrode assembly in which the reinforcing member is disposed on the peripheral portion of the polymer electrolyte membrane, the catalyst layer is formed inside the reinforcing member with no gap therebetween, and the catalyst layer is not substantially distorted or damaged by the pressing force generated at the time of assembling the stack.

Moreover, in the catalyst layer applying step of the method for manufacturing the membrane-electrode assembly of the present invention, the coating of the catalyst layer may be applied by spraying.

By the spraying, the coating of the catalyst layer can be easily applied so as to cover the entire surface inside the opening of the reinforcing member and to spread over the reinforcing member.

Moreover, the method for manufacturing the membrane-electrode assembly of the present invention further comprises: a composite member forming step of forming a composite member including the reinforcing member and a covering member which has a substantially same planar shape as the reinforcing member and covers one surface of the reinforcing member; and a covering member removing step of removing the covering member from the reinforcing member after applying the coating of the catalyst layer, wherein: in the reinforcing member disposing step, the composite member is disposed such that the reinforcing member is located closer to the polymer electrolyte membrane than the covering member; and in the catalyst layer applying step, the coating of the catalyst layer is applied so as to spread over an opening of the composite member and a region outside and surrounding the opening.

In accordance with the method, by removing the covering member after applying the coating of the catalyst layer, the main surface of the reinforcing member is not contaminated by catalyst particles. By collecting the catalyst particles on the covering member, the use efficiency of the catalyst can be improved. Note that the "substantially same planar shape" includes, for example, a case where the reinforcing member and the covering member do not completely overlap each other when one of the reinforcing member and the covering member has a minute cutout or hole, or when the reinforcing member and the covering member are slightly different in size from each other due to a manufacturing error.

Moreover, in the composite member forming step of the method for manufacturing the membrane-electrode assembly of the present invention, the composite member may be formed by bonding two resin sheets to each other and stamping them.

In accordance with the method, the composite member can be easily manufactured. Since the covering member and the reinforcing member have the same shape, the removed covering member can be used as the reinforcing member or can be repeatedly used as the covering member.

Moreover, in the method for manufacturing the membrane-electrode assembly of the present invention, the reinforcing member disposing step may include a first reinforcing member disposing step of disposing a first reinforcing member, whose frame portion is formed to surround an opening of the first reinforcing member, on a first polymer electrolyte membrane such that the frame portion covers a peripheral portion of at least one surface of the first polymer electrolyte membrane, and a second reinforcing member disposing step of disposing a second reinforcing member, whose frame portion is formed to surround an opening of the second reinforcing member, on the second polymer electrolyte membrane such that the frame portion covers a peripheral portion of at least one surface of the second polymer electrolyte membrane; and the catalyst layer applying step may include a first catalyst layer applying step of applying a coating of a first catalyst layer on at least an entire surface of the first polymer electrolyte membrane which surface is exposed from the opening of the first reinforcing member, and a second catalyst layer applying step of applying a coating of a second catalyst layer on at least an entire surface of the second polymer electrolyte membrane which surface is exposed from the opening of the second reinforcing member, and the method may further comprises a polymer electrolyte membrane contacting step of causing a surface, on which the coating of the first catalyst layer is not applied, of the first polymer electrolyte membrane on which the coating of the first catalyst layer is applied and a surface, on which the coating of the second catalyst layer is not applied, of the second polymer electrolyte membrane on which the coating of the second catalyst layer is applied to contact each other.

In accordance with the method, the coating of the catalyst layer can be separately applied to two polymer electrolyte membranes.

Moreover, the method for manufacturing the membrane-electrode assembly of the present invention may further comprise: a first composite member forming step of forming a first composite member including the first reinforcing member and a first covering member which has a substantially same planar shape as the first reinforcing member and covers one surface of the first reinforcing member; a second composite member forming step of forming a second composite member including the second reinforcing member and a second covering member which has a substantially same planar shape as the second reinforcing member and covers one surface of the second reinforcing member; a first covering member removing step of removing the first covering member from the first reinforcing member after applying the coating of the first catalyst layer; and a second covering member removing step of removing the second covering member from the second reinforcing member after applying the coating of the second catalyst layer, wherein: in the first reinforcing member disposing step, the first composite member may be disposed such that the first reinforcing member is located closer to the first polymer electrolyte membrane than the first covering member; in the second reinforcing member disposing step, the second composite member may be disposed such that the second reinforcing member is located closer to the second polymer electrolyte membrane than the second covering member; in the first catalyst layer applying step, the coating of the first catalyst layer may be applied so as to spread over an opening of the first composite member and a region outside and surrounding the opening; and in the second catalyst layer applying step, the coating of the second catalyst layer may be applied so as to spread over an opening of the second composite member and a region outside and surrounding the opening.

In accordance with the method, by removing the covering member after applying the coating of the catalyst layer, the main surface of the reinforcing member is not contaminated by the catalyst particles. By collecting the catalyst particles on the covering member, the use efficiency of the catalyst can be improved. In addition, the coating of the catalyst layer can be separately applied to two polymer electrolyte membranes.

Moreover, the method for manufacturing the membrane-electrode assembly of the present invention may further comprise: a first polymer electrolyte membrane holding step of holding the first polymer electrolyte membrane on one surface of a first backing member; and a second polymer electrolyte membrane holding step of holding the second polymer electrolyte membrane on one surface of a second backing member, wherein: in the first reinforcing member disposing step, the first composite member may be disposed on the first polymer electrolyte membrane such that the first reinforcing member covers a surface of the first polymer electrolyte membrane which surface is not held by the first backing member; and in the second reinforcing member disposing step, the second composite member may be disposed on the second polymer electrolyte membrane such that the second reinforcing member covers a surface of the second polymer electrolyte membrane which surface is not held by the second backing member, and the method may further comprise: a first backing member removing step of, before the polymer electrolyte membrane contacting step, removing the first backing member from the first polymer electrolyte membrane on which the coating of the first catalyst layer is applied; and a second backing member removing step of, before the polymer electrolyte membrane contacting step, removing the second backing member from the second polymer electrolyte membrane on which the coating of the second catalyst layer is applied.

In accordance with the method, by removing the covering member after applying the coating of the catalyst layer, the main surface of the reinforcing member is not contaminated by the catalyst particles. By collecting the catalyst particles on the covering member, the use efficiency of the catalyst can be improved. In addition, since the coating of the catalyst layer is applied to the polymer electrolyte membrane with the polymer electrolyte membrane fixed on the backing member, it is possible to surely prevent the generation of the wrinkling on the polymer electrolyte membrane.

Note that "contact" includes not only a case where two members are joined to each other so as to directly contact each other but also a case where two members are joined to each other via a certain member (a reinforcing member, a high-polymer electrolyte layer, and/or the like).

The above object, other objects, features, and advantages of the present invention will be made clear by the following detailed explanation of preferred embodiments with reference to the attached drawings.

Effects of the Invention

A method for manufacturing a membrane-electrode assembly of the present invention includes the above steps and the following effects. To be specific, it is possible to provide a method for efficiently manufacturing a membrane-electrode assembly in which a reinforcing member is disposed on a peripheral portion of a polymer electrolyte membrane, a catalyst layer is formed inside the reinforcing member with no gap therebetween, and the catalyst layer is not substantially distorted or damaged by a pressing force generated at the time of assembling a stack.

BRIEF DESCRIPTION OF THE DRAWINGS

FIG. 1-A is a process diagram schematically showing one example of a method for manufacturing a membrane-electrode assembly of Embodiment 1 of the present invention, and is a diagram showing only a polymer electrolyte membrane.

FIG. 1-B is a process diagram schematically showing one example of the method for manufacturing the membrane-electrode assembly of Embodiment 1 of the present invention, and is a diagram showing a step of attaching reinforcing members to the polymer electrolyte membrane.

FIG. 1-C is a process diagram schematically showing one example of the method for manufacturing the membrane-electrode assembly of Embodiment 1 of the present invention, and is a diagram showing the membrane-electrode assembly formed by applying coatings of catalyst layers on the reinforcing members.

FIG. 1-D is a process diagram schematically showing one example of the method for manufacturing the membrane-electrode assembly of Embodiment 1 of the present invention, and is a diagram showing a membrane-electrode-gas diffusion layer assembly formed by forming gas diffusion layers on the catalyst layers.

FIG. 3-A is a process diagram schematically showing one example of a method for manufacturing a membrane-electrode assembly of Embodiment 2 of the present invention, and is a diagram showing only a polymer electrolyte membrane.

FIG. 3-B is a process diagram schematically showing one example of the method for manufacturing the membrane-electrode assembly of Embodiment 2 of the present invention, and is a diagram showing a step of attaching reinforcing members and covering members to the polymer electrolyte membrane.

FIG. 3-C is a process diagram schematically showing one example of the method for manufacturing the membrane-electrode assembly of Embodiment 2 of the present invention, and is a diagram showing a state where coatings of catalyst layers are applied on the covering members.

FIG. 3-D is a process diagram schematically showing one example of the method for manufacturing the membrane-electrode assembly of Embodiment 2 of the present invention, and is a diagram showing a state where the covering members have been removed.

FIG. 3-E is a process diagram schematically showing one example of the method for manufacturing the membrane-electrode assembly of Embodiment 2 of the present invention, and is a diagram showing a membrane-electrode-gas diffusion layer assembly formed by forming gas diffusion layers on the catalyst layers.

FIG. 5-B is a process diagram schematically showing one example of the method for manufacturing the membrane-electrode assembly of Embodiment 3 of the present invention, and is a diagram showing a step of attaching reinforcing members and covering members to the polymer electrolyte membranes.

FIG. 5-C is a process diagram schematically showing one example of the method for manufacturing the membrane-electrode assembly of Embodiment 3 of the present invention, and is a diagram showing a state where coatings of catalyst layers are applied on the covering members.

FIG. 5-D is a process diagram schematically showing one example of the method for manufacturing the membrane-electrode assembly of Embodiment 3 of the present invention, and is a diagram showing a state where the covering members are removed.

FIG. 5-E is a process diagram schematically showing one example of the method for manufacturing the membrane-electrode assembly of Embodiment 3 of the present invention, and is a diagram showing a membrane-electrode assembly formed by joining the polymer electrolyte membranes to each other.

FIG. 5-F is a process diagram schematically showing one example of the method for manufacturing the membrane-electrode assembly of Embodiment 3 of the present invention, and is a diagram showing a membrane-electrode-gas diffusion layer assembly formed by forming gas diffusion layers on the catalyst layers.

FIG. 7-A is a process diagram schematically showing a method for manufacturing a membrane-catalyst layer-gas diffusion layer assembly by Example 1 of the present invention, and is a diagram showing a state where polymer electrolyte membranes are held on backing members.

FIG. 7-B is a process diagram schematically showing one example of the method for manufacturing the membrane-electrode assembly by Example 1 of the present invention, and is a diagram showing a state where reinforcing members and covering members are attached to the polymer electrolyte membranes.

FIG. 7-C is a process diagram schematically showing one example of the method for manufacturing the membrane-electrode assembly by Example 1 of the present invention, and is a diagram showing a state where coatings of catalyst layers are applied on the covering members.

FIG. 7-D is a process diagram schematically showing one example of the method for manufacturing the membrane-electrode assembly by Example 1 of the present invention, and is a diagram showing a state where the covering members are removed.

FIG. 7-E is a process diagram schematically showing one example of the method for manufacturing the membrane-electrode assembly by Example 1 of the present invention, and is a diagram showing a membrane-electrode assembly formed by joining the polymer electrolyte membranes to each other.

FIG. 7-F is a process diagram schematically showing one example of the method for manufacturing the membrane-electrode assembly by Example 1 of the present invention, and is a diagram showing a membrane-electrode-gas diffusion layer assembly formed by forming gas diffusion layers on the catalyst layers.

FIG. 7-G is a process diagram schematically showing one example of the method for manufacturing the membrane-electrode assembly by Example 1 of the present invention, and is a diagram showing a cell formed by joining gaskets and separators to the membrane-electrode-gas diffusion layer assembly.

FIG. 8-A is a process diagram schematically showing a method for manufacturing a membrane-catalyst layer-gas diffusion layer assembly by Comparative Example 1 of the present invention, and is a diagram showing a state where polymer electrolyte membranes are held on backing members.

FIG. 8-B is a process diagram schematically showing one example of the method for manufacturing the membrane-electrode assembly by Comparative Example 1 of the present invention, and is a diagram showing a state where coatings of catalyst layers are applied on the polymer electrolyte membranes.

FIG. 8-C is a process diagram schematically showing one example of the method for manufacturing the membrane-electrode assembly by Comparative Example 1 of the present invention, and is a diagram showing a state where frames are attached so as to surround outer peripheries of the catalyst layers.

FIG. 8-D is a process diagram schematically showing one example of the method for manufacturing the membrane-electrode assembly by Comparative Example 1 of the present invention, and is a diagram showing a membrane-electrode assembly formed by joining the polymer electrolyte membranes to each other.

FIG. 8-E is a process diagram schematically showing one example of the method for manufacturing the membrane-electrode assembly by Comparative Example 1 of the present invention, and is a diagram showing a membrane-electrode-gas diffusion layer assembly formed by forming gas diffusion layers on the catalyst layers.

FIG. 8-F is a process diagram schematically showing one example of the method for manufacturing the membrane-electrode assembly by Comparative Example 1 of the present invention, and is a diagram showing a cell formed by joining gaskets and separators to the membrane-electrode-gas diffusion layer assembly.

EXPLANATION OF REFERENCE NUMBERS

Figure 2:
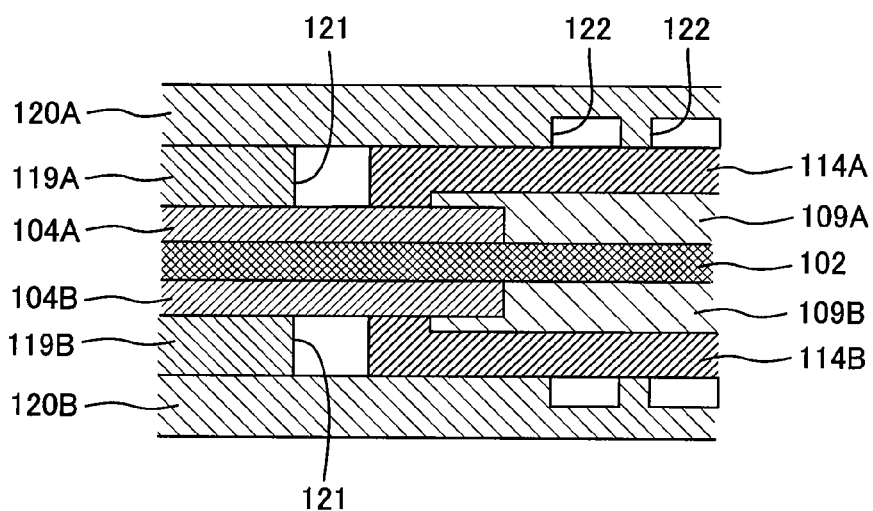
FIG. 2 is a schematic diagram showing a cross section of the membrane-electrode-gas diffusion layer assembly in a use condition manufactured by the method for manufacturing the membrane-electrode assembly of Embodiment 1 of the present invention.

102 polymer electrolyte membrane
104A, 104B reinforcing member
109A, 109B catalyst layer
113 membrane-electrode assembly
114A, 114B gas diffusion layer
115 membrane-electrode-gas diffusion layer assembly
119A, 119B gasket
120A, 120B separator
121 gap
122 passage
123A, 123B opening
202 polymer electrolyte membrane
204A, 204B reinforcing member
205A, 205B covering member
206A, 206B composite member
208A, 208B catalyst dispersing liquid layer
209A, 209B catalyst layer
213 membrane-electrode assembly
214A, 214B gas diffusion layer
215 membrane-electrode-gas diffusion layer assembly
219A, 219B gasket
220A, 220B separator
221 gap
222 passage
223A, 223B opening
302A, 302B polymer electrolyte membrane
304A, 304B reinforcing member
305A, 305B covering member
306A, 306B composite member
308A, 308B catalyst dispersing liquid layer
309A, 309B catalyst layer
312 polymer electrolyte membrane
313 membrane-electrode assembly
314A, 314B gas diffusion layer
315 membrane-electrode-gas diffusion layer assembly
319A, 319B gasket
320A, 320B separator
321 gap
322 passage
323 opening
401A, 401B PET substrate
402A, 402B polymer electrolyte membrane
403A, 403B substrate-membrane assembly
404A, 404B frame
405A, 405B mask body
406A, 406B multilayer frame
407A, 407B substrate-membrane-frame assembly
408A, 408B electrode catalyst dispersing liquid layer
409A, 409B catalyst layer
410A, 410B membrane-frame-catalyst layer assembly
411A, 411B substrate-membrane-frame-catalyst layer assembly
412 polymer electrolyte membrane
413 membrane-catalyst layer assembly
414A, 414B electrically-conductive-layer-carbon cloth
415 membrane-catalyst layer-gas diffusion layer assembly
419A, 419B gasket
420A, 420B separator
421 gap
422 passage
423A, 423B opening
424 cell
501A, 501B PET substrate
502A, 502B polymer electrolyte membrane
503A, 503B substrate-membrane assembly
504A, 504B frame
509A, 509B catalyst layer
511A, 511B substrate-membrane-frame-catalyst layer assembly
512 polymer electrolyte membrane
513 membrane-catalyst layer assembly
514A, 514B electrically-conductive-layer-carbon cloth
515 membrane-catalyst layer-gas diffusion layer assembly
516A, 516B membrane-catalyst layer assembly
517A, 517B substrate-membrane-catalyst layer assembly
518 gap
519A, 519B gasket
520A, 520B separator
521 gap
522 passage
524 cell

BEST MODE FOR CARRYING OUT THE INVENTION

Hereinafter, embodiments of the present invention will be explained with reference to the drawings.

Embodiment 1

Steps

FIGS. 1-A to 1-D are process diagrams schematically showing one example of a method for manufacturing a membrane-electrode assembly of Embodiment 1 of the present invention. FIG. 1-A is a diagram showing only a polymer electrolyte membrane. FIG. 1-B is a diagram showing a step of attaching reinforcing members to the polymer electrolyte membrane. FIG. 1-C is a diagram showing a membrane-electrode assembly formed by applying coatings of catalyst layers on the reinforcing members. FIG. 1-D is a diagram showing a membrane-electrode-gas diffusion layer assembly formed by forming gas diffusion layers on the catalyst layers. Hereinafter, the method for manufacturing the membrane-electrode assembly of the present embodiment will be explained with reference to FIGS. 1-A to 1-D. Note that these diagrams are schematic diagrams just showing positional relations of respective members in respective steps, and do not limit relative sizes, shapes, thickness, etc. of the members.

In a step shown in FIG. 1-A, a polymer electrolyte membrane 102 is prepared. The polymer electrolyte membrane 102 is preferably a film having proton conductivity. For example, a perfluoro sulfonic acid film is preferably used.

In a step shown in FIG. 1-B, reinforcing members 104A and 104B are attached to both surfaces of a peripheral portion of the polymer electrolyte membrane 102, respectively (reinforcing member disposing step). Each of the reinforcing members 104A and 104B has a frame portion which surrounds an opening 123A or 123B, and the outer periphery of the frame portion has a substantially same shape as the outer periphery of the polymer electrolyte membrane 102. Peripheral portions of both surfaces of the polymer electrolyte membrane 102 are covered with the frame portions of the reinforcing members 104A and 104B, respectively. The reinforcing members 104A and 104B is preferably made of a material having corrosion resistance (acid resistance) and heat resistance. For example, polytetrafluoroethylene resin (PTFE) is suitably used. The reinforcing members 104A and 104B are manufactured by, for example, stamping a PTFE sheet with Thomson mold. A method for attaching the reinforcing members 104A and 104B to the polymer electrolyte membrane 102 is preferably a method capable of realizing attachment with an appropriate strength. For example, thermocompression bonding, adhesive bonding using an adhesive, or the like is used.

In a step shown in FIG. 1-C, coatings of catalyst layers 109A and 109B (electrodes) are applied (catalyst layer applying step). Preferably used as the catalyst layers 109A and 109B is, for example, a mixture of catalyst support particles in which carbon particles support catalysts, such as platinum, and high-polymer electrolytes. When applying the coatings of the catalyst layers 109A and 109B, for example, high-polymer electrolyte resin is mixed in a solvent, such as alcohol or a mixture of alcohol and water, to prepare a dispersing liquid, and catalyst support particles are further added to the dispersing liquid to prepare a catalyst dispersing liquid. The catalyst dispersing liquid is applied on the polymer electrolyte membrane 102 and the reinforcing members 104 by using a known thin film manufacturing technique, such as a spraying method, a spin coating method, a doctor blade method, a die coating method, screen printing, or the like. Then, by drying and vaporizing the solvent, the catalyst layers 109A and 109B are formed. The spraying method is the most preferable as a method for applying the coatings of the catalyst layers.

In some cases, the application of the catalyst dispersing liquid causes the generation of wrinkling on the polymer electrolyte membrane. To prevent the generation of the wrinkling, it is preferable to fix the polymer electrolyte membrane at the time of the application of the coating of the catalyst layer. Examples of a method for fixing the polymer electrolyte membrane are a method for fixing the polymer electrolyte membrane by using a suction-fixing apparatus (suction-fixing apparatus using a pressure reduction system) capable of fixing the polymer electrolyte membrane on a worktable by suctioning it, and a method for fixing the polymer electrolyte membrane by using a backing member.

In the case of using the suction-fixing apparatus (suction-fixing apparatus using the pressure reduction system), the polymer electrolyte membrane is mounted on a processing stage of the suction-fixing apparatus (suction-fixing apparatus using the pressure reduction system), the suction-fixing apparatus suctions one surface (surface A) of the membrane to fix the membrane, the reinforcing member is attached to the opposite surface (surface B) of the membrane, and the coating of the catalyst layer is applied to the surface B. After the application of the coating of the catalyst layer to the surface B, the polymer electrolyte membrane is detached from the processing stage of the suction-fixing apparatus (suction-fixing apparatus using the pressure reduction system), the membrane is turned over, the suction-fixing apparatus suctions the surface B to again fix the polymer electrolyte membrane, the reinforcing member is attached to the surface A, and the coating of the catalyst layer is applied to the surface A.

In the case of using the backing member, first, the polymer electrolyte membrane is held on the backing member, the reinforcing member is attached to a surface (surface B) opposite a surface (surface A) contacting the backing member, and the coating of the catalyst layer is applied to the surface B. After the application of the coating of the catalyst layer to the surface B, the backing member is detached from the polymer electrolyte membrane, the reinforcing member is attached to the surface A, and the coating of the catalyst layer is applied to the surface A.

The coating of the catalyst layer 109A is applied so as to cover an entire surface of the polymer electrolyte membrane 102 which surface is exposed from the opening 123A of the reinforcing member 104A and to spread over a region outside and surrounding the opening 123A. The coating of the catalyst layer 109B is applied so as to cover an entire surface of the polymer electrolyte membrane 102 which surface is exposed from the opening 123B of the reinforcing member 104B and to spread over a region outside and surrounding the opening 123B. By the application of the coatings of the catalyst layers 109A and 109B, a membrane-electrode assembly 113 is obtained.

In a step shown in FIG. 1-D, gas diffusion layers 114A and 114B are formed to cover the catalyst layers 109A and 109B, respectively (gas diffusion layer disposing step). The gas diffusion layers 114A and 114B preferably have adequate gas permeability and electrical conductivity. For example, carbon cloth or the like is preferably used. A method for attaching the gas diffusion layers 114A and 114B is preferably a method capable of realizing attachment with an appropriate strength. For example, adhesive bonding using an adhesive is used. However, in the case of sandwiching by separators, etc., the membrane-electrode assembly 113 and the gas diffusion layers 114A and 114B may be just stacked without bonding them to each other. The gas diffusion layers 114A and 114B are preferably equal in size to or smaller than the catalyst layers 109A and 109B. The gas diffusion layer and the catalyst layer do not have to directly contact each other, and an additional layer may be disposed therebetween. By the formation of the gas diffusion layers 114A and 114B, a membrane-electrode-gas diffusion layer assembly 115 is obtained.

Structure

FIG. 2 is a schematic diagram showing a cross section of the membrane-electrode-gas diffusion layer assembly in a use condition manufactured by the method for manufacturing the membrane-electrode assembly of Embodiment 1 of the present invention. As shown in FIG. 2, in the membrane-electrode-gas diffusion layer assembly 115 in the use condition, the outer peripheries of the gas diffusion layers 114A and 114B are surrounded by frame-shaped gaskets 119A and 119B, respectively. Further, the membrane-electrode-gas diffusion layer assembly 115 and the gaskets 119A and 119B are sandwiched between separators 120A and 120B on an inner surface of each of which a passage 122 is formed so that the passages 122 of the separators 120A and 120B contact the gas diffusion layers 114A and 114B, respectively. In accordance with the method for manufacturing the membrane-electrode assembly of Embodiment 1, the catalyst layers 109A and 109B are formed so as to spread over the reinforcing members 104A and 104B, respectively, attached to the peripheral portions of the polymer electrolyte membrane 102. The gas diffusion layers 114A and 114B are disposed on the catalyst layers 109A and 109B, respectively. Gaps 121 are formed between the gas diffusion layer 114A and the gasket 119A and between the gas diffusion layer 114B and the gasket 119B, respectively. The gaps 121 do not contact the polymer electrolyte membrane 102. With this structure, entire gases supplied from the gas diffusion layers 114A and 114B pass through the catalyst layers 109A and 109B, respectively, and then reach the polymer electrolyte membrane 102.

Feature and Effect

A feature of the present embodiment is that the reinforcing members 104A and 104B are attached on the polymer electrolyte membrane 102, and the coatings of the catalyst layers 109 are applied on the polymer electrolyte membrane 102 so as to spread over the reinforcing members 104A and 104B. In accordance with the method, the catalyst layers 109A and 109B cover the entire surfaces of the polymer electrolyte membranes 102 which surfaces are exposed from the openings 123A and 123B, respectively, and no gap is formed between the catalyst layer 109A and the reinforcing member 104A and between the catalyst layer 109B and the reinforcing member 104B. With this structure, the gases from the gas diffusion layers 114A and 114B do not directly reach the polymer electrolyte membrane 102 (do not pass through the gap without passing through the catalyst layers 109A and 109B). Moreover, the coatings of the catalyst layers 109 are directly applied on the polymer electrolyte membrane 102. Therefore, even if the gas diffusion layers 114A and 114B are mounted on the reinforcing members 104A and 104B, respectively, and the gas diffusion layers are distorted or damaged, the catalyst layers will not be damaged.

As is clear from the above description, in accordance with the method for manufacturing the membrane-electrode assembly of Embodiment 1, it is possible to efficiently manufacture the membrane-electrode assembly in which the reinforcing member is disposed on the peripheral portion of the polymer electrolyte membrane, the catalyst layer is formed inside the reinforcing member with no gap therebetween, and the catalyst layer is not substantially distorted or damaged by the pressing force generated at the time of assembling the stack.

Moreover, in accordance with the method for manufacturing the membrane-electrode assembly of Embodiment 1, the coating of the catalyst layer is directly applied to the polymer electrolyte membrane so as to spread over the reinforcing member, unlike methods for manufacturing membrane-electrode assemblies of Embodiments 2 and 3 which will be described later. With this structure, the covering member becomes unnecessary, and the number of members can be reduced.

Embodiment 2

Steps

FIGS. 3-A to 3-E are process diagrams schematically showing one example of a method for manufacturing a membrane-electrode assembly of Embodiment 2 of the present invention. FIG. 3-A is a diagram showing only the polymer electrolyte membrane. FIG. 3-B is a diagram showing a step of attaching the reinforcing members and covering members to the polymer electrolyte membrane. FIG. 3-C is a diagram showing a state where the coatings of the catalyst layers are applied on the covering members. FIG. 3-D is a diagram showing a state where the covering members have been removed. FIG. 3-E is a diagram showing the membrane-electrode-gas diffusion layer assembly formed by forming the gas diffusion layers on the catalyst layers. Hereinafter, the method for manufacturing the membrane-electrode assembly of the present embodiment will be explained with reference to FIGS. 3-A to 3-E. Note that these diagrams are schematic diagrams just showing positional relations of respective members in respective steps, and do not limit relative sizes, shapes, thickness, etc. of the members. Needless to say, the same modification as Embodiment 1 can be made in Embodiment 2.

The method for manufacturing the membrane-electrode assembly of Embodiment 2 is the same as the method for manufacturing the membrane-electrode assembly of Embodiment 1 except that (1) a composite member formed by joining the reinforcing member and the covering member to each other is used instead of using the reinforcing member alone, and (2) the covering member is removed from the reinforcing member after the application of the coating of the catalyst layer. Therefore, same names are used for common members and methods, and detailed explanations thereof are omitted.

In a step shown in FIG. 3-A, a polymer electrolyte membrane 202 is prepared.

In a step shown in FIG. 3-B, a composite member 206A constituted of a reinforcing member 204A and a covering member 205A is attached to one surface of the peripheral portion of the polymer electrolyte membrane 202 such that the reinforcing member 204A contacts the polymer electrolyte membrane 202 (such that the reinforcing member 204A is located closer to the polymer electrolyte membrane 202 than the covering member 205A), and a composite member 206B constituted of a reinforcing member 204B and a covering member 205B is attached to the other surface of the peripheral portion of the polymer electrolyte membrane 202 such that the reinforcing member 206B contacts the polymer electrolyte membrane 202 (such that the reinforcing member 206B is located closer to the polymer electrolyte membrane 202 than the covering member 205B) (reinforcing member disposing step). The covering member 205A is made of the same material as the reinforcing member 204A, has a substantially same planar shape as the reinforcing member 204A, and covers one surface of the reinforcing member 204A. The covering member 205B is made of the same material as the reinforcing member 204B, has a substantially same planar shape as the reinforcing member 204B, and covers one surface of the reinforcing member 204B. The reinforcing member 204A and the covering member 205A have an opening 223A. The reinforcing member 204B and the covering member 205B have an opening 223B. The reinforcing member 204A and the covering member 205A, and the reinforcing member 204B and the covering member 205B are joined to each other such that only the covering members 205A and 205B can be removed after the application of the coatings of the catalyst layers. For example, two PTFE sheets are bonded to each other by using an adhesive having weak adhesive force. Then, for example, by a stamping process using Thomson mold, the composite member 206A having the opening 223A is formed (composite member forming step). The composite member 206B is also formed in the same manner. Note that the covering members 205A and 205B do not have to be made of the same material as the reinforcing members 204A and 204B, and may be made of other material (such as masking tape). For example, the covering members 205A and 205B may be constituted of frame-shaped metal plates. Such structure is efficient since the covering member can be reused many times in the manufacturing process. The reinforcing member 204A and the covering member 205A, and the reinforcing member 204B and the covering member 205B do not have to be bonded to each other. The covering member may be just mounted on the reinforcing member and sprayed. Since such structure does not require a bonding step, and the covering member is easily detached, the work efficiency improves. Regarding the shapes of the covering member and the reinforcing member, their openings need to conform to each other, but their outer edge portions do not have to conform to each other.

In a step shown in FIG. 3-C, coatings of catalyst dispersing liquid layers 208A and 208B (electrodes) are applied. The coating of the catalyst dispersing liquid layer 208A is applied so as to cover, with no gap therebetween, an entire surface of the polymer electrolyte membrane 202 which surface is exposed from the opening 223A and to spread over a region outside and surrounding the opening 223A, and the coating of the catalyst dispersing liquid layer 208B is applied so as to cover, with no gap therebetween, an entire surface of the polymer electrolyte membrane 202 which surface is exposed from the opening 223B and to spread over a region outside and surrounding the opening 223B (catalyst layer applying step). As with Embodiment 1, in a case where the wrinkling is generated on the polymer electrolyte membrane by the application of the catalyst dispersing liquid, it is preferable to apply the catalyst dispersing liquid with the polymer electrolyte membrane fixed by the suction-fixing apparatus (suction-fixing apparatus using the pressure reduction system) or the backing member.

In a step shown in FIG. 3-D, portions of the catalyst dispersing liquid layers 208A and 208B which portions spread over the regions outside and surrounding the openings 223A and 223B are removed together with the covering members 205A and 205B. The covering member 205A is detachably bonded to the reinforcing member 204A, so that it is easily removed from a main body portion, and the covering member 205B is also detachably bonded to the reinforcing member 204B, so that it is easily removed from the main body portion (covering member removing step). In accordance with this step, a catalyst layer 209A (first catalyst layer) is formed, with no gap therebetween, on the entire surface of the polymer electrolyte membrane 202 which surface is exposed from the opening 223A of the reinforcing member 204A, and a catalyst layer 209B (second catalyst layer) is formed, with no gap therebetween, on the entire surface of the polymer electrolyte membrane 202 which surface is exposed from the opening 223B of the reinforcing member 204B. Thus, a membrane-electrode assembly 213 is obtained. By protecting main surfaces of the reinforcing members 204A and 204B by the covering members 205A and 205B at the time of the application of the catalyst dispersing liquid, it is possible to prevent the main surfaces of the reinforcing members 204A and 204B from being contaminated by catalyst particles.

In a step shown in FIG. 3-E, gas diffusion layers 214A and 214B are formed on the catalyst layers 209A and 209B, respectively (gas diffusion layer disposing step). By the formation of the gas diffusion layers 214A and 214B, a membrane-electrode-gas diffusion layer assembly 215 is obtained. Note that the step of FIG. 3-E may be carried out before the step of FIG. 3-D.

Structure

Figure 4:
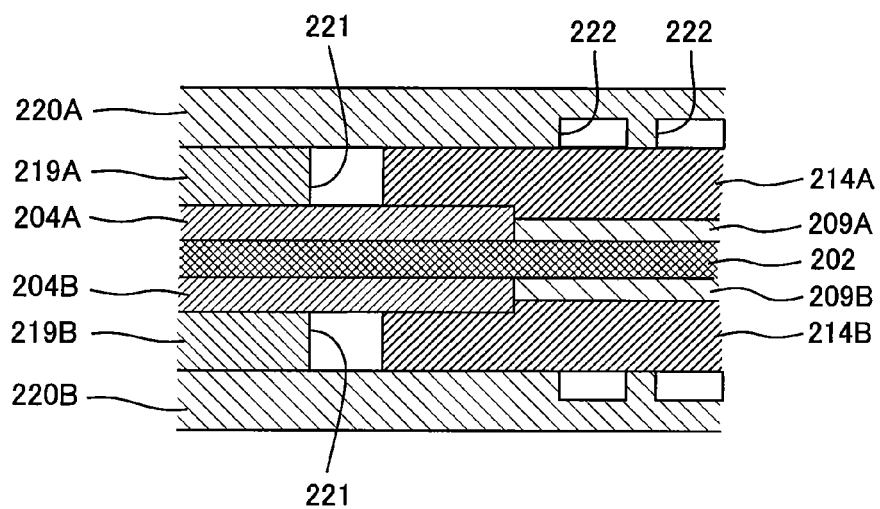
FIG. 4 is a schematic diagram showing a cross section of the membrane-electrode-gas diffusion layer assembly in a use condition manufactured by the method for manufacturing the membrane-electrode assembly of Embodiment 2 of the present invention.

FIG. 4 is a schematic diagram showing a cross section of the membrane-electrode-gas diffusion layer assembly 215 in a use condition manufactured by the method for manufacturing the membrane-electrode assembly of Embodiment 2 of the present invention. As shown in FIG. 4, in the membrane-electrode-gas diffusion layer assembly 215 in the use condition, the outer peripheries of the gas diffusion layers 214A and 214B are surrounded by frame-shaped gaskets 219A and 219B, respectively. Further, the membrane-electrode-gas diffusion layer assembly 215 and the gaskets 219A and 219B are sandwiched between separators 220A and 220B on an inner surface of each of which a passage 222 is formed so that the passages 222 of the separators 220A and 220B contact the gas diffusion layers 214A and 214B, respectively. In accordance with the method for manufacturing the membrane-electrode assembly of Embodiment 2, the catalyst layers 209A and 209B are formed so as not to spread over the reinforcing member 204A or 204B and not to form the gap between the reinforcing member 204A and the catalyst layer 209A or between the reinforcing member 204B and the catalyst layer 209B. The gas diffusion layers 214A and 214B are formed on the catalyst layers 209A and 209B, respectively. Gaps 221 are formed between the gas diffusion layer 214A and the gasket 219A and between the gas diffusion layer 214B and the gasket 219B, respectively. The gaps 221 do not contact the polymer electrolyte membrane 202. With this structure, entire gases supplied from the gas diffusion layers 214A and 214B pass through the catalyst layers 209A and 209B, respectively, and then reach the polymer electrolyte membrane 202. Since the catalyst layers 209A and 209B do not spread over the reinforcing member 204A or 204B, the gas diffusion layer 209A and the reinforcing member 204A, and the gas diffusion layer 209B and the reinforcing member 204B directly contact each other.

Feature and Effect

In accordance with the method for manufacturing the membrane-electrode assembly of Embodiment 2, as with Embodiment 1, it is possible to efficiently manufacture the membrane-electrode assembly in which the reinforcing member is disposed on the peripheral portion of the polymer electrolyte membrane, the catalyst layer is formed inside the reinforcing member with no gap therebetween, and the catalyst layer is not substantially distorted or damaged by the pressing force generated at the time of assembling the stack.

Further, Embodiment 2 has the following feature and effect. In Embodiment 1, the catalyst layer spreads over the surface of the reinforcing member. In a case where the catalyst layer is constituted of particulates, the spread catalyst layer enters between the gas diffusion layer and the reinforcing member, so that the adhesive state between the gas diffusion layer and the reinforcing member may deteriorate due to the particles of the catalyst layer. Moreover, in a case where a precious metal, such as platinum, is used as the catalyst of the catalyst layer, the amount of catalyst particles used at the time of manufacturing needs to be reduced as much as possible in light of economic efficiency. If the gas diffusion layer is formed on the spread catalyst layer, the catalyst of the spread catalyst layer does not contribute to the reaction of the electrode, resulting in the excessive use of the catalyst. In accordance with the method for manufacturing the membrane-electrode assembly of the present embodiment, after the application of the coating of the catalyst layer on the covering member, the covering member is removed from the reinforcing member. In accordance with the method, since the catalyst layer does not spread over the main surface of the reinforcing member (the main surface of the reinforcing member is not contaminated by the catalyst particles), the adhesive state between the reinforcing member and the gas diffusion layer improves. Moreover, at the time of assembling the stack, the peripheral portion of the membrane-electrode assembly is sandwiched between the gaskets, etc., and are pressure-bonded to each other. However, if the seal performance at the peripheral portion is low, problems, such as gas leakage, occur. In the present embodiment, since the catalyst particles do not remain on the surface of the reinforcing member, the gap is not substantially formed between the reinforcing member and the gasket, etc., so that the seal performance at the peripheral portion of the membrane-electrode assembly improves. The spread catalyst layer can be collected and reused together with the covering member, so that it is possible to prevent the excessive use of the catalyst.

Embodiment 3

Steps

Figure 5:
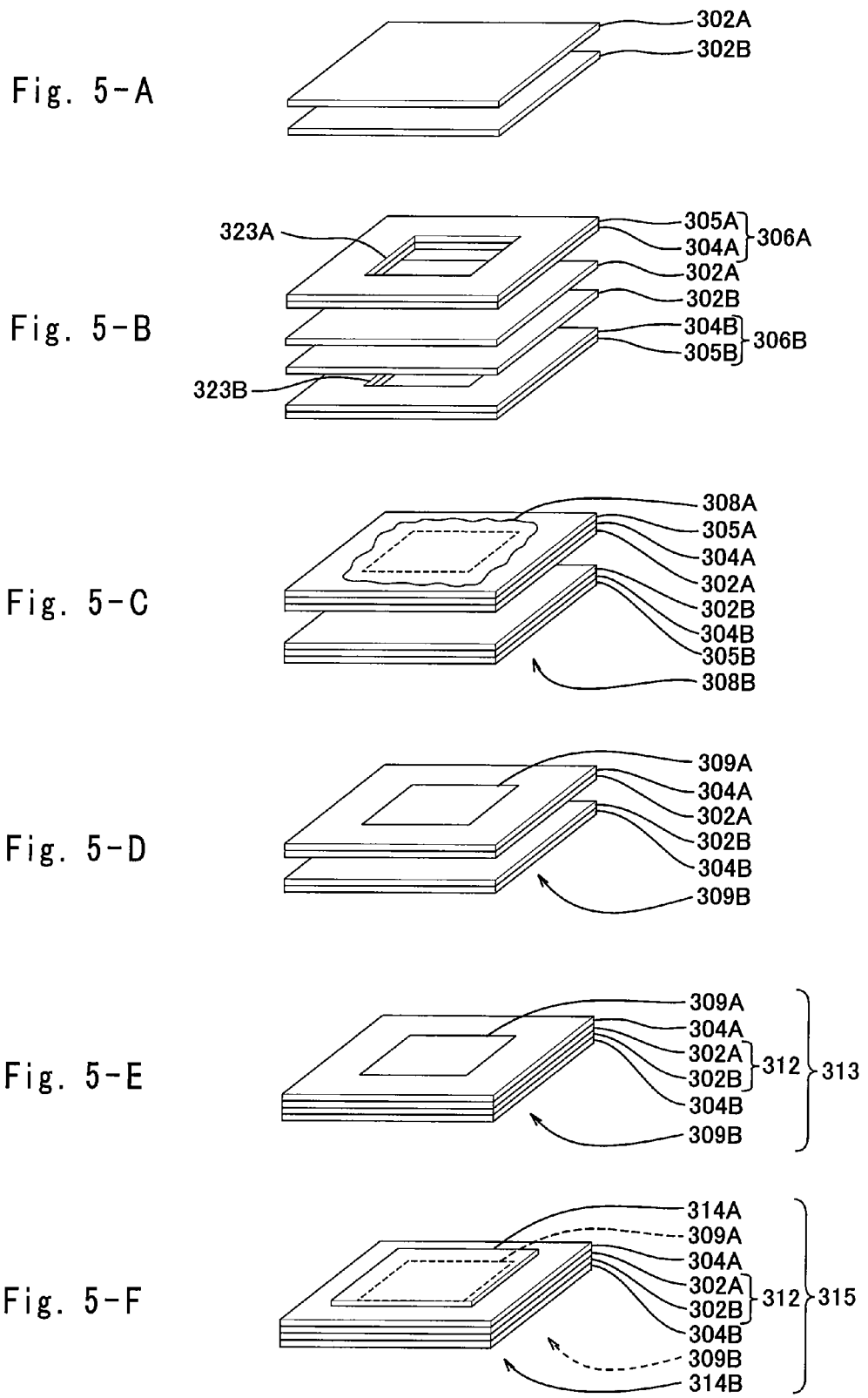
FIG. 5-A is a process diagram schematically showing one example of a method for manufacturing a membrane-electrode assembly of Embodiment 3 of the present invention, and is a diagram showing only polymer electrolyte membranes.

FIGS. 5-A to 5-F are process diagrams schematically showing one example of the method for manufacturing the membrane-electrode assembly of Embodiment 3 of the present invention. FIG. 5-A is a diagram showing only the polymer electrolyte membranes. FIG. 5-B is a diagram showing a step of attaching the reinforcing members and the covering members to the polymer electrolyte membranes. FIG. 5-C is a diagram showing a state where the coatings of the catalyst layers are applied on the covering members. FIG. 5-D is a diagram showing a state where the covering members are removed. FIG. 5-E is a diagram showing the membrane-electrode assembly formed by joining the polymer electrolyte membranes to each other. FIG. 5-F is a diagram showing the membrane-electrode-gas diffusion layer assembly formed by forming the gas diffusion layers on the catalyst layers. Hereinafter, the method for manufacturing the membrane-electrode assembly of the present embodiment will be explained with reference to FIGS. 5-A to 5-F. Note that these diagrams are schematic diagrams just showing positional relations of respective members in respective steps, and do not limit relative sizes, shapes, thickness, etc. of the members. Needless to say, the same modifications as Embodiments 1 and 2 can be made in Embodiment 3.

The method for manufacturing the membrane-electrode assembly of Embodiment 3 is the same as the method for manufacturing the membrane-electrode assembly of Embodiment 2 except that an anode-side reinforcing member and catalyst layer and a cathode-side reinforcing member and catalyst layer are formed on two polymer electrolyte membranes, respectively, instead of forming the reinforcing member and the catalyst layer on both sides of one polymer electrolyte membrane, and then the polymer electrolyte membranes are attached to each other. Therefore, same names are used for common members and methods, and detailed explanations thereof are omitted.

In a step shown in FIG. 5-A, a polymer electrolyte membrane 302A (first polymer electrolyte membrane) and a polymer electrolyte membrane 302B (second polymer electrolyte membrane) are prepared.

In a step shown in FIG. 5-B, a composite member 306A (first composite member) constituted of a reinforcing member 304A (first reinforcing member) and a covering member 305A (first covering member) is attached to a peripheral portion of one surface of the polymer electrolyte membrane 302A such that the reinforcing member 304A contacts the polymer electrolyte membrane 302A (such that the reinforcing member 304A is located closer to the polymer electrolyte membrane 302A than the covering member 305A) (first reinforcing member disposing step), and a composite member 306B (second composite member) constituted of a reinforcing member 304B (second reinforcing member) and a covering member 305B (second covering member) is attached to a peripheral portion of one surface of the polymer electrolyte membrane 302B such that the reinforcing member 304B contacts the polymer electrolyte membrane 302B (such that the reinforcing member 304B is located closer to the polymer electrolyte membrane 302B than the covering member 305B) (second reinforcing member disposing step). The reinforcing member 304A and the covering member 305A have an opening 323A. The reinforcing member 304B and the covering member 305B have an opening 323B. The composite members 306A and 306B are formed in the same manner as Embodiment 2 (first composite member forming step, second composite member forming step).

In a step shown in FIG. 5-C, a coating of a catalyst dispersing liquid layer 308A (electrode) is applied so as to spread over the opening 323A and a region outside and surrounding the opening 323A (first catalyst layer applying step), and a coating of a catalyst dispersing liquid layer 308B (electrode) is applied so as to spread over the opening 323B and a region outside and surrounding the opening 323B (second catalyst layer applying step). As with Embodiments 1 and 2, in a case where wrinkling is generated on the polymer electrolyte membrane by the application of the catalyst dispersing liquid, it is preferable to apply the catalyst dispersing liquid with the polymer electrolyte membrane fixed by the suction-fixing apparatus (suction-fixing apparatus using the pressure reduction system) or the backing member. In the present embodiment, since the polymer electrolyte membranes 302A and 302B are prepared to respectively correspond to both surfaces, it is preferable to attach the composite members 306A and 306B and form catalyst layers 309A (first catalyst layer) and 309B (second catalyst layer) with the polymer electrolyte membranes 302A and 302B fixed. Alternatively, the polymer electrolyte membranes 302A and 302B may be held on the backing member, and the composite members 306A and 306B may be attached and the catalyst layers 309A and 309B may be formed with the polymer electrolyte membranes 302A and 302B fixed on the backing member.

In a step shown in FIG. 5-D, a portion of the catalyst dispersing liquid layer 308A which portion spreads over the region outside and surrounding the opening 323A of the covering member 305A is removed together with the covering member 305A (first covering member removing step), and a portion of the catalyst dispersing liquid layer 308B which portion spreads over the region outside and surrounding the opening 323B of the covering member 305B is removed together with the covering member 305B (second covering member removing step). In accordance with this step, it is possible to obtain a structure in which the catalyst layer 309B is formed, with no gap therebetween, on an entire surface of the polymer electrolyte membrane 302A which surface is exposed from the opening 323A of the reinforcing member 304A, and a structure in which the catalyst layer 309B is formed, with no gap therebetween, on an entire surface of the polymer electrolyte membrane 302B which surface is exposed from the opening 304B of the reinforcing member 304B.

In a step shown in FIG. 5-E, the structures obtained in the fourth step are attached to each other such that their surfaces on which the catalyst layer is not formed are attached to each other. The polymer electrolyte membrane 302A is detached from the suction-fixing apparatus (suction-fixing apparatus using the pressure reduction system) or the backing member, the polymer electrolyte membrane 302B is detached from the suction-fixing apparatus (suction-fixing apparatus using the pressure reduction system) or the backing member, and surfaces of the polymer electrolyte membranes 302A and 302B which surfaces has contacted the suction-fixing apparatus (suction-fixing apparatus using the pressure reduction system) or the backing member contact each other and are attached to each other (polymer electrolyte membrane contacting step). Hot pressing is suitably used for this attachment. By the hot pressing, gases, such as air, between the polymer electrolyte membranes 302A and 302B are easily removed, and the polymer electrolyte membranes 302A and 302B are joined to each other to form a polymer electrolyte membrane 312. In accordance with this step, it is possible to obtain a membrane-electrode assembly 313 in which the catalyst layer 309A (first catalyst layer) is formed, with no gap therebetween, on an entire surface of the polymer electrolyte membrane 312 which surface is exposed from the opening 323A of the reinforcing member 304A, and the catalyst layer 309B (first catalyst layer) is formed, with no gap therebetween, on an entire surface of the polymer electrolyte membrane 312 which surface is exposed from the opening 323B of the reinforcing member 304B.

In a step shown in FIG. 5-F, gas diffusion layers 314A and 314B are disposed on the catalyst layers 309A and 309B, respectively (gas diffusion layer disposing step). By disposing the gas diffusion layers 314A and 314B, a membrane-electrode-gas diffusion layer assembly 315 is obtained.

Note that the step of FIG. 5-D, the step of FIG. 5-E and the step of FIG. 5-F may be carried out in any order.

Structure

Figure 6:
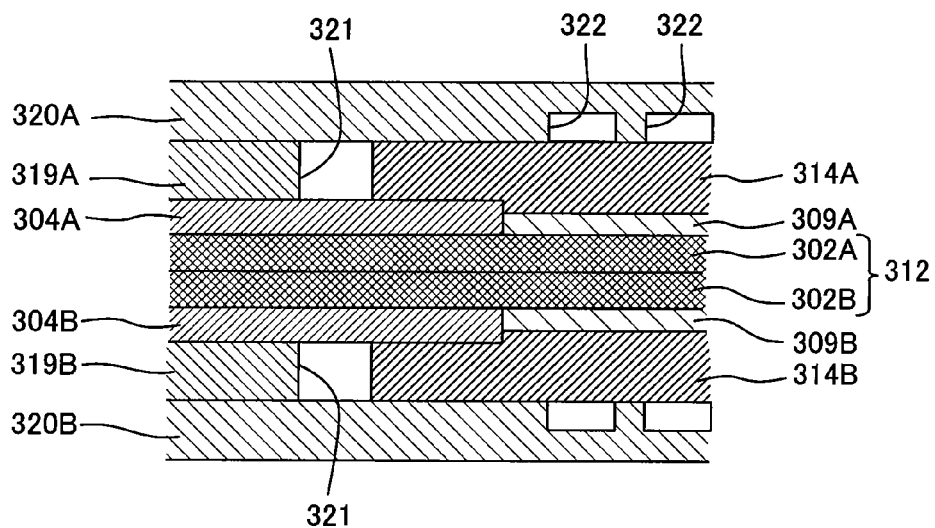
FIG. 6 is a schematic diagram showing a cross section of the membrane-electrode-gas diffusion layer assembly in a use condition manufactured by the method for manufacturing the membrane-electrode assembly of Embodiment 3 of the present invention.

FIG. 6 is a schematic diagram showing a cross section of the membrane-electrode-gas diffusion layer assembly 315 in a use condition manufactured by the method for manufacturing the membrane-electrode assembly of Embodiment 3 of the present invention. As shown in FIG. 6, in accordance with the method for manufacturing the membrane-electrode assembly of Embodiment 3, the polymer electrolyte membrane 302A and the polymer electrolyte membrane 302B are integrally formed into a polymer electrolyte membrane 312. In the membrane-electrode-gas diffusion layer assembly 315 in the use condition, the outer periphery of the gas diffusion layer 314A is surrounded by a frame-shaped gasket 319A, and the outer periphery of the gas diffusion layer 314B is surrounded by a frame-shaped gasket 319B. Further, the membrane-electrode-gas diffusion layer assembly 315 and the gaskets 319A and 319B are sandwiched between separators 320A and 320B on an inner surface of each of which a passage 322 is formed so that the passages 322 of the separators 320A and 320B contact the gas diffusion layers 314A and 314B, respectively. In accordance with the method for manufacturing the membrane-electrode assembly of Embodiment 3, the catalyst layer 309A is formed so as not to spread over the reinforcing member 304A and not to form a gap between the reinforcing member 304A and the catalyst layer 309A, and the catalyst layer 309B is formed so as not to spread over the reinforcing member 304B and not to form a gap between the reinforcing member 304B and the catalyst layer 309B. The gas diffusion layer 314A is disposed to cover the catalyst layer 309A, and the gas diffusion layer 314B is disposed to cover the catalyst layer 309B. Gaps 221 are formed between the gas diffusion layer 314A and the gasket 319A and between the gas diffusion layer 314B and the gasket 319B, respectively. The gaps 321 do not contact the polymer electrolyte membrane 312. With this structure, in a case where gases supplied from the gas diffusion layers 314A and 314B reaches the polymer electrolyte membrane 312, the gas surely pass through the catalyst layer 309A or 309B. Since the catalyst layers 309A and 309B do not spread over the reinforcing member 304A or 304B, the gas diffusion layer 309A and the reinforcing member 304A, and the gas diffusion layer 309B and the reinforcing member 304B directly contact each other.

Feature and Effect

In accordance with the method for manufacturing the membrane-electrode assembly of Embodiment 3, as with Embodiment 2, it is possible to efficiently manufacture the membrane-electrode assembly in which the reinforcing member is disposed on the peripheral portion of the polymer electrolyte membrane, and the catalyst layer is formed inside the reinforcing member with no gap therebetween. Moreover, the adhesive state between the reinforcing member and the gas diffusion layer improves, and the seal performance at the time of assembling the stack also improves. By collecting and reusing the spread catalyst layer together with the covering member, it is possible to prevent the waste of the catalyst.

Further, Embodiment 3 has the following feature and effect. In Embodiments 1 and 2, the coatings of the catalyst layers are applied on both surfaces of the single polymer electrolyte membrane, respectively. Therefore, after the coating of the catalyst layer is applied on one surface of the polymer electrolyte membrane, it is necessary to detach the polymer electrolyte membrane from the suction-fixing apparatus (suction-fixing apparatus using the pressure reduction system) or the backing member, turn the membrane over, and fix the membrane again. In a case where the polymer electrolyte membrane is made of a material which is delicate and tends to generate wrinkling, the serious wrinkling may be generated on the membrane only by detaching the membrane from the suction-fixing apparatus (suction-fixing apparatus using the pressure reduction system) or the backing member. In accordance with the method for manufacturing the membrane-electrode assembly of Embodiment 3, two polymer electrolyte membranes are prepared to respectively correspond to both surfaces, and the attachment of the reinforcing members and the application of the coatings of the catalyst layers can be carried out with the polymer electrolyte membranes kept fixed. With this method, it is possible to efficiently prevent the wrinkling of the polymer electrolyte membrane.

Modification Example

Hereinafter, modification examples of Embodiments 1 to 3 will be explained. The characteristics (planar shape, thickness, etc.) of the high-polymer electrolyte, the reinforcing member, the opening, etc. are not especially limited. It is preferable that the reinforcing member cover the peripheral portion of the polymer electrolyte membrane in a frame-shaped manner, however the outer periphery of the reinforcing member and the outer periphery of the polymer electrolyte membrane do not have to conform to each other. The covering member does not have to have the same shape as the reinforcing member, however it is preferable that the covering member covers at least the region (region where the coating of the catalyst layer spreads over) outside and surrounding the opening of the reinforcing member. The polymer electrolyte membrane may have therein a reinforcing membrane. The reinforcing member, the catalyst layer and a gas forming layer may be disposed only on one surface of the polymer electrolyte membrane. The order of the above steps is not limited to the above order, and may be changed. The composite member does not have to be formed independently from the polymer electrolyte membrane, and the polymer electrolyte membrane, the reinforcing member and the covering member may be stacked in any order. For example, the reinforcing member and the covering member may be sequentially stacked on the polymer electrolyte membrane. In Embodiment 3, without disposing the covering member, the polymer electrolyte membrane may be covered with only the reinforcing member. When applying the catalyst layer by using the suction-fixing apparatus (suction-fixing apparatus using the pressure reduction system), the coating of the catalyst layer may be applied while being heated by a heater or the like.

Example 1

Example 1 is an example of Embodiment 3 of the present invention. In Example 1, the polymer electrolyte membrane is fixed on the backing member, and the attachment of the reinforcing member and the application of the coating of the catalyst layer are carried out with the polymer electrolyte membrane fixed on the backing member. FIGS. 7-A to 7-E are process diagrams schematically showing a method for manufacturing the membrane-catalyst layer-gas diffusion layer assembly by Example 1 of the present invention. FIG. 7-A is a diagram showing a state where the polymer electrolyte membranes are held on the backing members. FIG. 7-B is a diagram showing a state where the reinforcing members and the covering members are attached to the polymer electrolyte membranes. FIG. 7-C is a diagram showing a state where the coatings of the catalyst layers are applied on the covering members. FIG. 7-D is a diagram showing a state where the covering members are removed. FIG. 7-E is a diagram showing the membrane-electrode assembly formed by joining the polymer electrolyte membranes to each other. FIG. 7-F is a diagram showing the membrane-electrode-gas diffusion layer assembly formed by forming the gas diffusion layers on the catalyst layers. FIG. 7-G is a diagram showing the cell formed by joining the gaskets and the separators to the membrane-electrode-gas diffusion layer assembly. Hereinafter, the method for manufacturing the membrane-catalyst layer-gas diffusion layer assembly by Example 1 will be explained in detail with reference to FIGS. 7-A to 7-G. Note that these diagrams are schematic diagrams just showing positional relations of respective members in respective steps, and relative sizes, shapes, thickness, etc. of the members do not correspond to the actual proportions.

Preparation of Membrane

Prepared were PET substrates 401A (first backing member) and 401B (second backing member) each of which was made of polyethylene terephthalate (PET) having a thickness of about 100 μm and a square main surface whose one side was 200 mm, and the surfaces of the PET substrates 401A and 401B were treated with a silicon based release agent.

A dispersing liquid (dried resin having an ion exchange capacity of 1.1 milliequivalents per gram, Product Name: Flemion, produced by Asahi Glass Co., Ltd., hereinafter referred to as "dispersing liquid A") of ion-exchange resins including a repeating unit based on $CF_2=CF_2$ and a repeating unit based on $CF_2=CF-OCF_2CF(CF_3)-OCF_2CF_2SO_3H$ was prepared. By the die coating method, the dispersing liquid A was applied to one surface of each of the PET substrates 401A and 401B so as to be a square whose thickness was 15 μm and one side was 160 mm. The dispersing liquid A was dried on the PET substrates 401A and 401B at a temperature of 90 degrees C. for 30 minutes. In this step, a substrate-membrane assembly 403A was formed (first polymer electrolyte membrane holding step), in which a polymer electrolyte membrane 402A (first polymer electrolyte membrane) was mounted on the PET substrate 401A, and a substrate-membrane assembly 403B was formed (second polymer electrolyte membrane holding step), in which a polymer electrolyte membrane 402B (second polymer electrolyte membrane) was mounted on the PET substrate 401B (FIG. 7-A). Thus, the polymer electrolyte membranes 402A and 402B were held on and fixed to the PET substrates 401A and 401B, respectively. The adhesive forces between the polymer electrolyte membrane 402A and the PET substrate 401A and between the polymer electrolyte membrane 402B and the PET substrate 401B were suitable since the wrinkling was not generated even if the coating of the catalyst layer was applied, and the polymer electrolyte membranes 402A and 402B could be easily detached from the PET substrates 401A and 401B, respectively, after the application of the coating of the catalyst layer.

Formation and Attachment of Frame

Prepared were two substrates (hereinafter referred to as "PTFE substrate") each of which was made of polytetrafluoroethylene (PTFE) having a thickness of about 100 μm and a square main surface whose one side was 150 mm. These two PTFE substrates were joined to each other. The bonded PTFE substrates were stamped with Thomson mold such that a square opening 423A (hole) whose one side was 100 mm was formed at a center thereof. Thus, a multilayer frame 406A (first composite member) was obtained (first composite member forming step), which has a dual structure of a frame 404A (first reinforcing member) constituted of the PTFE substrate and a mask body 405A (first covering member) constituted of the PTFE substrate. Similarly, a multilayer frame 406B (second composite member) was obtained (second composite member forming step), which has a dual structure of a frame 404B (second reinforcing member) constituted of the PTFE substrate and a mask body 405B (second covering member) constituted of the PTFE substrate and has an opening 423B. At the outer peripheries of the multilayer frames 406A and 406B, guiding cutouts were formed (see "Attachment of Polymer Electrolyte Membranes").

The multilayer frame 406A was bonded by an adhesive to a center of an upper surface of the substrate-membrane assembly 403A such that the frame 404A contacted the polymer electrolyte membrane 402A (such that the reinforcing member 404A covered a surface of the polymer electrolyte membrane 402A which surface is not held by the backing member 401A). In this step, a substrate-membrane-frame assembly 407A was formed (first reinforcing member disposing step), in which the polymer electrolyte membrane 402A, the frame 404A and the mask body 405A were sequentially stacked on the PET substrate 401A. Moreover, the multilayer frame 406B was bonded by an adhesive to a center of an upper surface of the substrate-membrane assembly 403B such that the frame 404B contacted the polymer electrolyte membrane 402B (such that the reinforcing member 404B covered a surface of the polymer electrolyte membrane 402B which surface is not held by the backing member 401B). In this step, a substrate-membrane-frame assembly 407B was formed (second reinforcing member disposing step), in which the polymer electrolyte membrane 402B, the frame 404B and the mask body 405B were sequentially stacked on the PET substrate 401B (FIG. 7-B).

Application of Coating of Catalyst Layer

A dispersing liquid (hereinafter referred to as "electrode catalyst dispersing liquid") having a solid concentration of 14 mass % was prepared by dispersing, in a mixed dispersion medium of ethanol and water (mass ratio of 1:1), the dispersing liquid A and a catalyst supporting carbon powder prepared by causing an acetylene black based carbon powder to support, at 50 mass %, platinum catalyst whose mean diameter was about 3 nm. Next, the electrode catalyst dispersing liquid was sprayed on the substrate-membrane-frame assembly 407A so as to cover, with no gap therebetween, an entire surface of the polymer electrolyte membrane 402A which surface was exposed from the opening 423A of the multilayer frame 406A and to spread over the mask body 405A (to spread over a region outside and surrounding the opening 423A) (first catalyst layer applying step). Moreover, the electrode catalyst dispersing liquid was sprayed on the substrate-membrane-frame assembly 407B so as to cover, with no gap therebetween, an entire surface of the polymer electrolyte membrane 402B which surface was exposed from the opening 423B of the multilayer frame 406B and to spread over the mask body 405B (to spread over a region outside and surrounding the opening 423B) (second catalyst layer applying step). In this step, the entire surface of the polymer electrolyte membrane 402 which surface was exposed from the openings 423A and 423B, and part of the mask bodies 405A and 405B were covered with the electrode catalyst dispersing liquid layer 408 (FIG. 7-C).

The electrode catalyst dispersing liquid layers 408A and 408B were dried on the substrate-membrane-frame assemblies 407A and 407B, respectively, at a temperature of 90 degrees C. for 30 minutes, and then the mask bodies 405A and 405B were detached (first covering member removing step, second covering member removing step). In this step, the entire surface of the polymer electrolyte membrane 402A which surface was exposed from the opening 423A of the frame 404A and the entire surface of the polymer electrolyte membrane 402B which surface was exposed from the opening 423B of the frame 404B were covered with the catalyst layers 409A (first catalyst layer) and 409B (second catalyst layer), respectively. In this step, a membrane-frame-catalyst layer assembly 410A was formed, in which the frame 404A was stacked on the polymer electrolyte membrane 402A, and the entire surface of the polymer electrolyte membrane 402A which surface was exposed from the opening 423A of the frame 404A was covered with the catalyst layer 409A with no gap therebetween. Moreover, a membrane-frame-catalyst layer assembly 410B was formed, in which the frame 404B was stacked on the polymer electrolyte membrane 402B, and the entire surface of the polymer electrolyte membrane 402B which surface was exposed from the opening 423B of the frame 404B was covered with the catalyst layer 409B with no gap therebetween. In accordance with the above method, manufactured were a substrate-membrane-frame-catalyst layer assembly 411A in which the membrane-frame-catalyst layer assembly 410A was held on the PET substrate 401A and a substrate-membrane-frame-catalyst layer assembly 411B in which the membrane-frame-catalyst layer assembly 410B was held on the PET substrate 401B (FIG. 7-D).

Attachment of Polymer Electrolyte Membranes

A guide frame was manufactured by perpendicularly fitting metal rods in a plate at such an interval that the metal rods fitted the cutout portion of each of the frames 404A and 404B. The PET substrate 401B was removed from the substrate-membrane-frame-catalyst layer assembly 411B (second backing member removing step). The obtained membrane-frame-catalyst layer assembly 410B was fitted in the guide frame such that the cutout of the frame fitted the metal rods, and the polymer electrolyte membrane 402B faced upward. Further, the PET substrate 401A was removed from the substrate-membrane-frame-catalyst layer assembly 411A (first backing member removing step). The obtained membrane-frame-catalyst layer assembly 410A was fitted in the guide frame such that the cutout of the frame fitted the metal rods, and the polymer electrolyte membrane 402A faced downward. The membrane-frame-catalyst layer assemblies 410A and 410B contact each other along the guide frame, are detached from the guide frame, and are joined to each other by hot pressing at a temperature of 150 degrees C. and a pressure of 50 kg/cm$^2$ for 20 minutes (polymer electrolyte membrane contacting step). By this bonding, the polymer electrolyte membranes 402A and 402B were integrally formed into a polymer electrolyte membrane 412. After the bonding, a portion of the polymer electrolyte membrane 412 protruding from the frames 404A and 404B was cut. By fitting the cutout in the guide frame, the membrane-frame-catalyst layer assemblies 410A and 410B could be stacked without misalignment of the outer periphery. In accordance with the above method, a membrane-catalyst layer assembly 413 (membrane-electrode assembly) was manufactured, in which the peripheral portions of both surfaces of the polymer electrolyte membrane 412 were reinforced by the frames 404A and 404B, respectively, and the entire surface of the polymer electrolyte membrane 412 which surface was exposed from the opening 423A of the frame 404A and the entire surface of the polymer electrolyte membrane 412 which surface was exposed from the opening 423B of the frame 404B were covered with the catalyst layers 409, respectively, with no gap therebetween (FIG. 7-E).

Formation of Gas Diffusion Layer

Each of electrically-conductive-layer-carbon cloths 414A (first gas diffusion layer) and 414B (second gas diffusion layer) each having a 104 mm square was manufactured by forming a electrically-conductive layer, made of carbon black and polytetrafluoroethylene particles and having a thickness of about 10 μm, on one surface of a carbon cloth substrate having a thickness of about 300 μm, and stamping the obtained substrate with Thomson mold. The electrically-conductive-layer-carbon cloth 414A was disposed such that the conductive layer of the electrically-conductive-layer-carbon cloth 414A contacted the catalyst layer 409A and covered the entire surface of the catalyst layer 409A (first gas diffusion layer forming step). Moreover, the electrically-conductive-layer-carbon cloth 414B was disposed such that the electrically-conductive layer of the electrically-conductive-layer-carbon cloth 414B contacted the catalyst layer 409B and covered the entire surface of the catalyst layer 409B (second gas diffusion layer forming step). In this step, a membrane-catalyst layer-gas diffusion layer assembly 415 (membrane-electrode-gas diffusion layer assembly) was manufactured, in which the peripheral portions of both surfaces of the polymer electrolyte membrane 412 were reinforced by the frames 404A and 404B, respectively, the entire surface of the polymer electrolyte membrane 412 which surface was exposed from the opening 423A of the frame and the entire surface of the polymer electrolyte membrane 412 which surface was exposed from the opening 423B of the frame were covered with the catalyst layers 409A and 409B, respectively, with no gap therebetween, and the entire surface of the catalyst layer 409A and the entire surface of the catalyst layer 409B were covered with the electrically-conductive-layer-carbon cloths 414A and 414B, respectively (FIG. 7-F).

Assembling by Gaskets and Separators

Prepared were two substrates (hereinafter referred to as "PTFE substrate") each of which was made of polytetrafluoroethylene (PTFE) having a thickness of about 100 μm and a square main surface whose one side was 150 mm. Each of the PTFE substrates was stamped with Thomson mold such that a square hole whose one side was 120 mm was formed at a center thereof. The obtained PTFE frames were used as gaskets 419A and 419B.

Moreover, prepared were two carbon plates having a thickness of 2 mm and a square main surface whose one side was 150 mm. On one surface of each of the carbon plates, a serpentine passage having a width of 5 mm and an interval of 7 mm was formed as a passage 422. The obtained carbon plates each having the passage were used as separators 420A and 420B.

The gaskets 419A and 419B were attached to both surfaces of the membrane-catalyst layer-gas diffusion layer assembly 415, respectively, so as to surround the gas diffusion layers 414A and 414B, respectively. The membrane-electrode-gas diffusion layer assembly 415 and the gaskets 419A and 419B were sandwiched between the separators 420A and 420B such that the passages 422 of the separators 420A and 420B contacted the gas diffusion layers 414A and 414B, respectively, and these members were joined to each other in this state (FIG. 7-G). In accordance with the above method, a cell 424 was obtained.

Confirmation of Cross Section

The cell 424 thus obtained was cut along a straight line passing through the openings 423A and 423B, and the obtained cross section was observed with a microscope (enlarged view of FIG. 7-G). As shown in FIG. 7-G, no significant gap was formed between the catalyst layer 409A and the frame 404A. Although a gap 421 was formed between the gas diffusion layer (electrically-conductive-layer-carbon cloth 414A) and the gasket 419A, the gap 421 was not in contact with the polymer electrolyte membrane 412. With this structure, it was confirmed that it was possible to prevent the fuel gas and the oxidant gas from flowing from the gas diffusion layer (electrically-conductive-layer-carbon cloths 414A and 414B) directly to the polymer electrolyte membrane 412 (without passing through the catalyst layers 409A and 409B).

Modification Example

The guide frame and the cutout are not a must to stack the assemblies without the misalignment of the outer periphery. A preferable result could be obtained by, for example, forming alignment marks (crossmarks, or the like) at four corners of the assembly, and aligning the assemblies while checking the marks with a CCD or the like.

Comparative Example 1

In Comparative Example 1, the catalyst layer is formed on the polymer electrolyte membrane, and then the frame is attached. FIGS. 8-A to FIG. 8-E are process diagrams schematically showing a method for manufacturing the membrane-catalyst layer-gas diffusion layer assembly by Comparative Example 1 of the present invention. FIG. 8-A is a diagram showing a state where the polymer electrolyte membranes are held on the backing members. FIG. 8-B is a diagram showing a state where the coatings of the catalyst layers are applied on the polymer electrolyte membranes. FIG. 8-C is a diagram showing a state where the frames are attached to the outer peripheries of the catalyst layers. FIG. 8-D is a diagram showing the membrane-electrode assembly formed by joining the polymer electrolyte membranes to each other. FIG. 8-E is a diagram showing the membrane-electrode-gas diffusion layer assembly formed by forming the gas diffusion layers on the catalyst layers. FIG. 8-F is a diagram showing the cell formed by joining the gaskets and the separators to the membrane-electrode-gas diffusion layer assembly. Hereinafter, the method for manufacturing the membrane-catalyst layer-gas diffusion layer assembly by Comparative Example 1 will be explained in detail with reference to FIGS. 8-A to FIG. 8-F.

Preparation of Membrane

Substrate-membrane assemblies 503A and 503B each of which was constituted of the PET substrate and the polymer electrolyte membrane were manufactured in the same manner as Example (FIG. 8-A).

Application of Coatings of Catalyst Layer

The electrode catalyst dispersing liquid was prepared in the same manner as Example. Next, the electrode catalyst dispersing liquid was applied to a center of one main surface of each of the substrate-membrane assemblies 503A and 503B by the screen printing such that a printed surface was a square whose one side is 98 mm. The electrode catalyst dispersing liquid was dried on the substrate-membrane assemblies 503A and 503B at a temperature of 90 degrees C. for 30 minutes. In this step, membrane-catalyst layer assemblies 516A and 516B were formed by stacking the catalyst layers on the polymer electrolyte membranes. In accordance with the above method, substrate-membrane-catalyst layer assemblies 517A and 517B were manufactured, in each of which the membrane-catalyst layer assembly was held on the PET substrate (FIG. 8-B).

Formation and Attachment of Frame

Prepared were substrates (hereinafter referred to as "PTFE substrate") each of which was made of polytetrafluoroethylene (PTFE) having a thickness of about 100 μm and a square main surface whose one side was 150 mm. Each of the PTFE substrates was stamped with Thomson mold such that a square hole (opening) whose one side was 100 mm was formed at a center thereof. Thus, frames 504A and 504B made of the PTFE substrates were obtained. As with Example 1, a guiding cutout was formed on the outer periphery of each of the frames 504A and 504B.

The frames 504A and 504B were mounted on centers of main surfaces of the substrate-membrane-catalyst layer assemblies 517A and 517B, respectively, on each of which surfaces the polymer electrolyte membrane and the catalyst layer were disposed, such that the inner peripheries of the frames 504A and 504B did not overlap the catalyst layers 509A and 509B, respectively. In this state, hot pressing was carried out at a temperature of about 150 degrees C. for 20 minutes. In accordance with the above method, substrate-membrane-frame-catalyst layer assemblies 511A and 511B were manufactured, in each of which the polymer electrolyte membrane and the frame were sequentially stacked on the PET substrate, and the catalyst layer was fitted in the opening of the frame (FIG. 8-C).

Attachment of Polymer Electrolyte Membranes

In the same manner as Example, the PET substrates 501 were detached from the substrate-membrane-frame-catalyst layer assemblies 511A and 511B, and the polymer electrolyte membranes 502 sides were attached to each other. By this attachment, a membrane-catalyst layer assembly 513 (membrane-electrode assembly) was manufactured, in which the frames 504A and 504B were formed on both surfaces of a polymer electrolyte membrane 512, respectively, and the catalyst layers 509A and 509B were fitted in the frames 504A and 504B, respectively (FIG. 8-D).

Formation of Gas Diffusion Layer

In the same manner as Example, electrically-conductive-layer-carbon cloths 514A and 514B were manufactured. The electrically-conductive-layer-carbon cloth 514A was attached on the catalyst layer 509A such that the electrically-conductive layer of the electrically-conductive-layer-carbon cloth 514A contacted the catalyst layer 509A, and the electrically-conductive-layer-carbon cloth 514B was attached on the catalyst layer 509B such that the electrically-conductive layer of the electrically-conductive-layer-carbon cloth 514B contacted the catalyst layer 509B. Thus, a membrane-catalyst layer-gas diffusion layer assembly 515 (membrane-electrode-gas diffusion layer assembly) was manufactured (FIG. 8-E).

Assembling by Gaskets and Separators

In the same manner as Example, gaskets 519A and 519B and separators 520A and 520B were manufactured, and by joining them to the membrane-catalyst layer-gas diffusion layer assembly 515, a cell 524 was obtained (FIG. 8-F).

Confirmation of Cross Section

The cell 524 thus obtained was cut along a straight line passing through the insides of the openings of the frames 504A and 504B, and the obtained cross section was observed with a microscope (enlarged view of FIG. 8-F). As shown in FIG. 8-F, in the cross section, a gap 518 of about 1 mm was formed between the catalyst layer 509A and the inner periphery of the frame 504A in addition to a gap 521 formed between the gas diffusion layer (electrically-conductive-layer-carbon cloth 514A) and the gasket 519A. In accordance with this structure, the fuel gas and the oxidant gas were expected to flow from the gas diffusion layer (electrically-conductive-layer-carbon cloth 514A, 514B) directly to the polymer electrolyte membrane 512 via the gap 518 (without passing through the catalyst layer 509A, 509B).

Comparison Between Example 1 and Comparative Example 1

In a case where the electrode catalyst dispersing liquid was applied on the polymer electrolyte membrane used in Example 1 and Comparative Example 1, the polymer electrolyte membrane expanded or contracted largely (about 10 to 20 mm per 200 mm). Moreover, the degree of expansion and contraction changed depending on humidity, membrane thickness, etc., and it was difficult to predict how much the membrane expands or contracts.

In Comparative Example 1, before attaching the frame to the polymer electrolyte membrane, the coating of the catalyst layer was applied to the polymer electrolyte membrane. In consideration of the degree of expansion and contraction, in order that the catalyst layer and the frame do not overlap each other, it was necessary that the catalyst layer was formed to be smaller than the frame by at least 1 mm on both sides. As a result, a gap was necessarily formed.

In contrast, in Example 1, the frame was attached to the polymer electrolyte membrane before applying the coating of the catalyst layer on the polymer electrolyte membrane, and the coating of the catalyst layer was applied so as to partially overlap the frame. In accordance with the method, there were no gap or overlap between the catalyst layer and the frame (the inner periphery of the frame and the outer periphery of the catalyst layer contacted each other with no gap therebetween), and a structure in which the catalyst layer and the frame tightly contacted each other could be easily manufactured. Moreover, since the catalyst layer did not spread over the reinforcing member, the adhesive state between the reinforcing member and the gas diffusion layer improved. It was suggested that by collecting and reusing the spread catalyst layer together with the covering member, it is possible to prevent the waste of the catalyst. In a case where the coating of the catalyst layer is applied to one polymer electrolyte membrane, wrinkling may be generated by expansion or contraction, making it difficult to carry out the following process. In Example 1, by applying the coating of the catalyst layer on the polymer electrolyte membrane with the polymer electrolyte membrane fixed on the PET substrate, the generation of the wrinkling could be prevented effectively.

From the foregoing explanation, many modifications and other embodiments of the present invention are obvious to one skilled in the art. Therefore, the foregoing explanation should be interpreted only as an example, and is provided for the purpose of teaching the best mode for carrying out the present invention to one skilled in the art. The structures and/or functional details may be substantially modified within the spirit of the present invention.

INDUSTRIAL APPLICABILITY

A method for manufacturing a membrane-electrode assembly of the present invention is useful as a method for efficiently manufacturing a membrane-electrode assembly in which a reinforcing member is disposed on a peripheral portion of a polymer electrolyte membrane, a catalyst layer is formed inside the reinforcing member with no gap therebetween, and the catalyst layer is not substantially distorted or damaged by a pressing force generated at the time of assembling a stack.

The invention claimed is:
1. A method for manufacturing a membrane-electrode assembly, comprising:
a reinforcing member disposing step of disposing a reinforcing member, whose frame portion is formed to surround an opening of the reinforcing member, on a polymer electrolyte membrane such that the frame portion covers a peripheral portion of at least one surface of the polymer electrolyte membrane;
a catalyst layer applying step of applying a coating of a catalyst layer on an entire surface of the polymer electrolyte membrane, which surface is exposed from the opening of the reinforcing member, such that the catalyst layer spreads outside the opening when viewed from a thickness direction of the catalyst layer; and
a gas diffusion layer disposing step of disposing a gas diffusion layer such that the gas diffusion layer covers the catalyst layer,
wherein the reinforcing member disposing step, the catalyst layer applying step, and the gas diffusion layer disposing step are performed in the stated order.
2. The method according to claim 1, wherein in the catalyst layer applying step, the coating of the catalyst layer is applied by spraying.
3. The method according to claim 1, further comprising:
a composite member forming step of forming a composite member including the reinforcing member and a covering member which has a substantially same planar shape as the reinforcing member and covers one surface of the reinforcing member; and
a covering member removing step of removing the covering member from the reinforcing member after applying the coating of the catalyst layer, wherein:
in the reinforcing member disposing step, the composite member is disposed such that the reinforcing member is located closer to the polymer electrolyte membrane than the covering member; and
in the catalyst layer applying step, the coating of the catalyst layer is applied so as to spread outside an opening of the composite member when viewed from the thickness direction of the catalyst layer.
4. The method according to claim 3, wherein in the composite member forming step, the composite member is formed by bonding two resin sheets to each other and stamping them.
5. The method according to claim 1, wherein:
the reinforcing member disposing step includes a first reinforcing member disposing step of disposing a first reinforcing member, whose frame portion is formed to surround an opening of the first reinforcing member, on a first polymer electrolyte membrane such that the frame portion covers a peripheral portion of at least one surface of the first polymer electrolyte membrane, and a second reinforcing member disposing step of disposing a second reinforcing member, whose frame portion is formed to surround an opening of the second reinforcing member, on the second polymer electrolyte membrane such that the frame portion covers a peripheral portion of at least one surface of the second polymer electrolyte membrane; and the catalyst layer applying step includes a first catalyst layer applying step of applying a coating of a first catalyst layer on at least an entire surface of the first polymer electrolyte membrane which surface is exposed from the opening of the first reinforcing member, and a second catalyst layer applying step of applying a coating of a second catalyst layer on at least an entire surface of the second polymer electrolyte membrane which surface is exposed from the opening of the second reinforcing member, the method further comprising a polymer electrolyte membrane contacting step of causing a surface, on which the coating of the first catalyst layer is not applied, of the first polymer electrolyte membrane on which the coating of the first catalyst layer is applied and a surface, on which the coating of the second catalyst layer is not applied, of the second polymer electrolyte membrane on which the coating of the second catalyst layer is applied to contact each other.

6. The method according to claim 5, further comprising:

a first composite member forming step of forming a first composite member including the first reinforcing member and a first covering member which has a substantially same planar shape as the first reinforcing member and covers one surface of the first reinforcing member;

a second composite member forming step of forming a second composite member including the second reinforcing member and a second covering member which has a substantially same planar shape as the second reinforcing member and covers one surface of the second reinforcing member;

a first covering member removing step of removing the first covering member from the first reinforcing member after applying the coating of the first catalyst layer; and a second covering member removing step of removing the second covering member from the second reinforcing member after applying the coating of the second catalyst layer, wherein:

in the first reinforcing member disposing step, the first composite member is disposed such that the first reinforcing member is located closer to the first polymer electrolyte membrane than the first covering member;

in the second reinforcing member disposing step, the second composite member is disposed such that the second reinforcing member is located closer to the second polymer electrolyte membrane than the second covering member;

in the first catalyst layer applying step, the coating of the first catalyst layer is applied so as to spread over an opening of the first composite member and a region outside and surrounding the opening; and in the second catalyst layer applying step, the coating of the second catalyst layer is applied so as to spread over an opening of the second composite member and a region outside and surrounding the opening.

7. The method according to claim 5, further comprising:

a first polymer electrolyte membrane holding step of holding the first polymer electrolyte membrane on one surface of a first backing member; and a second polymer electrolyte membrane holding step of holding the second polymer electrolyte membrane on one surface of a second backing member, wherein:

in the first reinforcing member disposing step, the first composite member is disposed on the first polymer electrolyte membrane such that the first reinforcing member covers a surface of the first polymer electrolyte membrane which surface is not held by the first backing member; and in the second reinforcing member disposing step, the second composite member is disposed on the second polymer electrolyte membrane such that the second reinforcing member covers a surface of the second polymer electrolyte membrane which surface is not held by the second backing member, the method further comprising:

a first backing member removing step of, before the polymer electrolyte membrane contacting step, removing the first backing member from the first polymer electrolyte membrane on which the coating of the first catalyst layer is applied; and a second backing member removing step of, before the polymer electrolyte membrane contacting step, removing the second backing member from the second polymer electrolyte membrane on which the coating of the second catalyst layer is applied.

* * * * *